United States Patent
Svec et al.

(10) Patent No.: US 10,126,747 B1
(45) Date of Patent: Nov. 13, 2018

(54) COORDINATION OF MOBILE DRIVE UNITS

(71) Applicant: Amazon Technologies, Inc., Seattle, WA (US)

(72) Inventors: Petr Svec, Burlington, MA (US); Matthew Paul Bell, Newton Highlands, MA (US); Michael T. Barbehenn, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 14/869,265

(22) Filed: Sep. 29, 2015

(51) Int. Cl.
| | | |
|---|---|---|
| G05B 19/04 | (2006.01) | |
| G05B 19/18 | (2006.01) | |
| G06F 19/00 | (2018.01) | |
| G06G 7/76 | (2006.01) | |
| G05D 1/02 | (2006.01) | |
| G05B 13/00 | (2006.01) | |
| G01C 21/00 | (2006.01) | |
| B65G 47/04 | (2006.01) | |
| G06F 17/10 | (2006.01) | |
| G06G 7/78 | (2006.01) | |
| G08G 1/16 | (2006.01) | |
| G06G 7/70 | (2006.01) | |
| G08G 1/00 | (2006.01) | |
| B65B 21/02 | (2006.01) | |
| B65B 69/00 | (2006.01) | |
| B65B 65/04 | (2006.01) | |

(52) U.S. Cl.
CPC .............. *G05D 1/02* (2013.01); *B65G 47/04* (2013.01); *G01C 21/00* (2013.01); *G05B 13/00* (2013.01); *G06F 19/00* (2013.01); *G06G 7/76* (2013.01)

(58) Field of Classification Search
CPC .......... G05D 1/02; G05B 13/00; G01C 21/00; G06F 19/00; G06G 7/76; B65G 47/04
USPC .............. 701/301, 117; 700/255; 414/331.13
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2008/0147306 A1* | 6/2008 | Hayashi ............... | G05D 1/0289 701/117 |
| 2009/0093960 A1* | 4/2009 | Puhalla ................. | B60W 30/09 701/301 |
| 2011/0071761 A1* | 3/2011 | Cummings ........... | B60W 30/09 701/301 |
| 2011/0103924 A1* | 5/2011 | Watt ....................... | B65G 47/04 414/331.13 |

\* cited by examiner

*Primary Examiner* — Mahmoud S Ismail
(74) *Attorney, Agent, or Firm* — Kilpatrick Townsend & Stockton LLP

(57) ABSTRACT

In one example, an intersection of a first path and a second path may be determined. The first path may be associated with a first mobile drive unit and the second path may be associated with a second mobile drive unit. A plurality of velocity sets may be determined based on the intersection. A velocity set may be selected from the plurality of velocity sets. The velocity set may include velocity values that correspond to the first mobile drive unit and the second mobile drive unit. The selected velocity set may be provided to at least one of the first mobile drive unit or the second mobile drive unit.

20 Claims, 18 Drawing Sheets

COORDINATION OF MOBILE DRIVE UNITS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
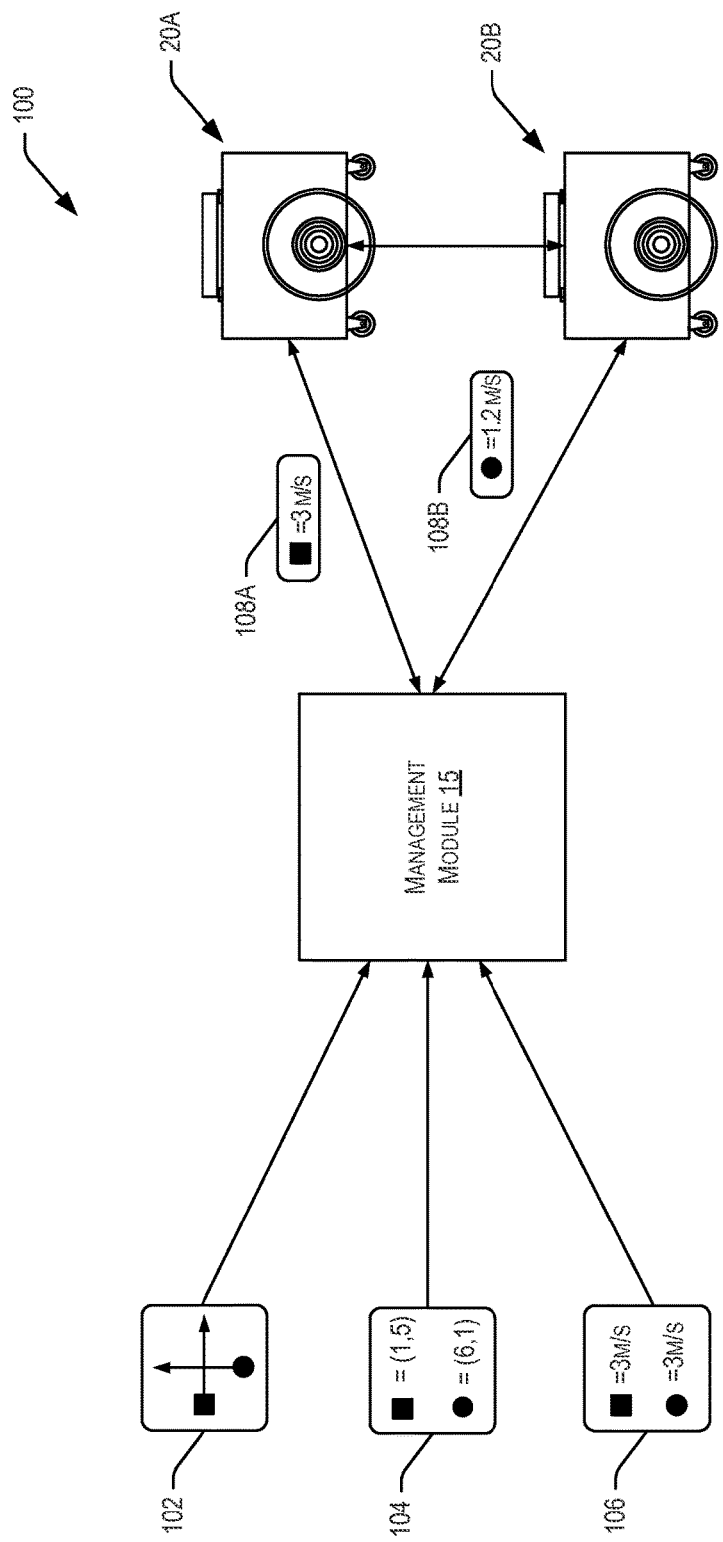
FIG. 1 illustrates a schematic diagram including an example management module and mobile drive units depicting techniques relating to discrete event-based coordination of mobile drive units as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and mobile drive units for moving the inventory holders. In particular, operation of the mobile drive units within the inventory system may be managed using discrete event-based coordination techniques. Discrete event-based coordination may be utilized at intersection points of drive paths of the mobile drive units. For example, the mobile drive units may receive tasks from a management module which may direct the mobile drive units to move inventory holders among different locations in the inventory system. For each task, a drive path may be generated. The drive paths may be geometric paths that the mobile drive units will follow in order to execute the tasks (e.g., move inventory holders from a first location to a second location). In some instances, the drive paths may follow pre-determined "roadways" within the inventory system, which may include one or more directional lanes. In some instances, the drive paths may not be restricted to roadways, but may instead correspond to areas of the inventory system designated for mobile drive unit travel. In either case, the drive paths will often overlap and/or intersect. The presence of overlapping and/or intersecting drive paths may result in some mobile drive units having to completely stop their travel in order to avoid collisions with other mobile drive units and then returning back to their earlier velocities. Such stopping and starting may result in inefficient operation of the inventory system, increased wear and tear on physical components of the mobile drive units because of aggressive starts and stops, increased amnesty from inventory items falling from the inventory holders, and decreased traffic predictability.

The discrete event-based coordination techniques described herein may be used to resolve potential collision events between two or more mobile drive units at intersections. The discrete event-based coordination techniques may view each intersection as a discrete event with each mobile drive unit having an initial state prior to the intersection and a final state shortly after clearing the intersection (see FIG. 7). A set of initial states of the mobile drive units prior to the intersection is termed an initial discrete event state of the group of drives. A set of final states of the mobile drive units shortly after clearing the intersection is called a final discrete event state of the group of mobile drive units. The initial states, for two mobile drive units, may depend on initial velocities (e.g., a speed and a heading) and initial locations along drive paths. The intersection of two drive paths may depend on the initial states of the two mobile drive units operating along the two drive paths. The final states, for the drive units, may depend on final velocities determined using the techniques described herein (e.g., velocity profiles) and final locations along the drive path after the intersection has been cleared. In this manner, each intersection within the inventory system may be independently analyzed. When a new intersection is encountered, the most recent state information (e.g., the final velocities and final locations in this example) may be used for determining updated velocity profiles for the mobile drive units in order to avoid a collision at the new intersection. In this manner, not only are potential collision events resolved (i.e., collisions are avoided), but velocities may be determined for the mobile drive units. Selection of a series of velocities ultimately used for each of the mobile drive units at different, subsequent discrete event states may be performed in a manner that considers certain scoring metrics related to the operation of the inventory system.

In a particular example, two drive paths for two mobile drive units may be accessed. An intersection of the two drive paths may be determined based on initial velocities for the mobile drive units at time=0 and initial locations for the mobile drive units at time=0. If the velocities of the mobile drive units are not adjusted, the mobile drive units will likely collide at the intersection. A set of potential yield rules for the two mobile drive units may also be determined. The set of potential yield rules may indicate different possible combinations for the mobile drive units to arrive at the intersection. For instance, a first mobile drive unit may yield to a second mobile drive unit, the second mobile drive unit may yield to the first mobile drive unit, both mobile drive units may yield to each other, neither mobile drive unit may yield to the other, and so forth. The set of potential yield rules may be narrowed to exclude certain yield rules that would produce an undesirable result (e.g., rules that would lead to both mobile drive units yielding to each other). Using the set of potential yield rules, a set of candidate velocity sets may be initialized. In some examples, there may be at least two ways of determining velocities of mobile drive units. First, the velocity of a mobile drive unit may be determined to be the maximum allowed velocity if the mobile drive unit is supposed not to yield to another mobile drive unit as dictated by the yield rule. Second, the velocity may be computed in a manner that aims to avoid a collision at the intersection if the mobile drive unit is supposed to yield to another mobile drive unit based on the yield rule. Like with the set of potential yield rules, the set of candidate velocity sets may be narrowed to exclude certain candidate velocity sets that would produce an undesirable result (e.g., sets that would lead to collisions at the intersection) or that are duplicative. Once the velocity values are computed, each of the candidate velocity sets may be assigned a score based on a scoring metric. An optimal candidate velocity set may then be selected based on its score compared to scores for other candidate velocity sets. In some examples, the scoring metric may include any suitable cost function, which may ensure smooth speed transitions, efficient operation of the mobile drive units, minimization of travel time, and/or other benefits.

Turning now to the figures, FIG. 1 illustrates a schematic diagram 100 including a management module 15 and mobile drive units 20A and 20B depicting techniques relating to event-based coordination of mobile drive units as described herein. In particular, the management module 15 may be configured to receive, access, or acquire certain types of information from one or more sources. For example, the management module 15 may receive drive path information 102, position information 104, and/or velocity information 106 from an inventory management system. The management module 15 may function in association with the inventory management system to implement the techniques described herein. In some examples, the drive path information 102, the position information 104, and/or the velocity information 106 are stored in one or more databases accessible by the management module 15. In some examples, the drive path information 102, the position information 104, and/or the velocity information 106 may be received directly from the mobile drive units 20A, 20B. In other words, each of the mobile drive units 20A, 20B may either compute or receive the drive path information 102, the position information 104, and/or the velocity information 106, which may be stored locally on the mobile drive units 20A, 20B and provided to the management module 15 periodically, when requested (e.g., via a ping), or in any other suitable manner. In some examples, as described herein, the management module 15 may be distributed among the mobile drive units 20A, 20B.

In any event, the management module 15 may access the drive path information 102, the position information 104, and/or the velocity information 106 in order to implement the techniques described herein. The drive path information 102 may indicate drive paths for at least the first mobile drive unit 20A and the second mobile drive unit 20B. The drive paths identified by the drive path information 102 may be generated as part of assigning one or more tasks to each of the mobile drive units 20A, 20B. For example, a particular task may indicate that the first mobile drive unit 20A move to an inventory storage area, collect a particular inventory holder, and move the inventory holder to a station within a picking area where an inventory item may be taken from the inventory holder and packaged. A particular drive path corresponding to the particular task may indicate event nodes (e.g., a location of the inventory holder and a location of the picking station) and a sequence of directions to get from one event node to the other. For example, the sequence of directions may include a listing of turn-by-turn directions that the first mobile drive unit 20A should follow to complete the task. In some examples, the particular drive path may be disconnected from the task. This may enable portions of the particular drive path to be recycled for use with other mobile drive units 20 performing other tasks.

Starting and stopping locations, event nodes, sequences of directions, and other locations associated with the drive path information 102 may be represented as two-dimensional geometric coordinates. For example, a workspace in which the mobile drive units 20A, 20B operate (e.g., a warehouse) may be divided into a grid, with each unit of the grid representing an actual location on a floor within the workspace. In some examples, the drive path information 102 may be represented in terms of turns located at geometric locations and directions between the geometric locations. The position information 104 may represent one or more positions of the mobile drive units 20A, 20B at a particular point in time. The one or more positions may be represented in terms of two-dimensional geometric coordinates (e.g., (1, 5) and (6, 1)). Because the mobile drive units 20A, 20B may be moving, the position information 104 may be associated with a particular point in time. To this end, the position information 104 may at least indicate an initial position for the first mobile drive unit 20A at time=0 and an initial position for the second mobile drive unit 20B at time=0. In some examples, the position information 104 may be provided to the management module 15 via the mobile drive units 20A, 20B.

In some examples, each of the mobile drive units 20A, 20B may be associated with a safety measure. The safety measure may indicate a spacing that the mobile drive units 20A, 20B keep between themselves, a spacing that the mobile drive units 20A, 20B maintain between themselves and other obstacles in the inventory system, and any other suitable spacing. The safety measure may define one or more spacing values in terms of one or more safety buffer zones that extend around the mobile drive units. For example, a first safety buffer zone may include an area that surrounds the first mobile drive unit 20A. This area may be represented in any suitable fashion and shape and may include, for example, a certain number of square blocks that correspond to the geometric grid of the workspace. For example, the area may include six square blocks that surround the first mobile drive unit 20A. In some examples, the shape of the area may be uniform about the first mobile drive unit 20A or non-uniform. For example, the area may be greater on a leading side of the first mobile drive unit 20A (e.g., in the direction of travel of the first mobile drive unit 20A and smaller in a trailing side and/or sides located between the trailing and leading sides (e.g., sides of the first mobile drive unit 20A). The area may be considered when the management module 15 evaluates the information 102-106 in order to generate instructions to avoid collisions. In this manner, avoiding a collision may be defined by the two mobile drive units 20A, 20B passing each other without intersecting their respective safety buffer zones. In some examples, the safety buffer zones may be dynamic depending on the velocity of the mobile drive units 20A, 20B. For example, when the first mobile drive unit 20A is traveling at a higher velocity, a greater safety buffer zone, e.g., at its leading side, may be desirable as compared to when the first mobile drive unit 20A is traveling at a lower velocity. This may be because at the higher velocity, the first mobile drive unit 20A may take longer to slow down. In some examples, the safety buffer zones may be dynamic based on a load being carried by the first mobile drive unit 20A (e.g., in an inventory holder).

The velocity information 106 may represent velocity values (e.g., 3 m/s and 3 m/s) for each of the mobile drive units 20A, 20B at a particular point in time. In some examples, the velocity information 106 may include instantaneous velocities. In some examples, this point in time may be taken at the same time as the position information 104 or at a different point in time. The velocity information 106 may be provided to the management module 15 via the mobile drive units 20A, 20B, computed from sets of location data (e.g., by determining an average velocity by measuring the time it takes a mobile drive unit to move from a first location to a second location). In some examples, the velocity information 106 may include speed information and heading information.

Based at least in part on the drive path information 102, the position information 104, and/or the velocity information 106, the management module 15 may implement the techniques described herein to generate a first velocity value 108A for the first mobile drive unit 20A and a second velocity value 108B for the second mobile drive unit 20B. The first and second velocity values 108A, 108B may be computed in a manner that avoids a potential collision between the mobile drive units 20A, 20B. For example, it may be that had both the mobile drive units 20A, 20B continued at 3 m/s (as indicated by the velocity information 106), the mobile drive units 20A, 20B would have collided at some intersection of their respective drive paths. However, in this example, the management module 15 has computed the second velocity value 108B for the second mobile drive unit 20B to be 1.2 m/s. Such an adjusted velocity value may cause the second mobile drive unit 20B to pass the intersection shortly after the first mobile drive unit 20A has already cleared the intersection.

Figure 2:
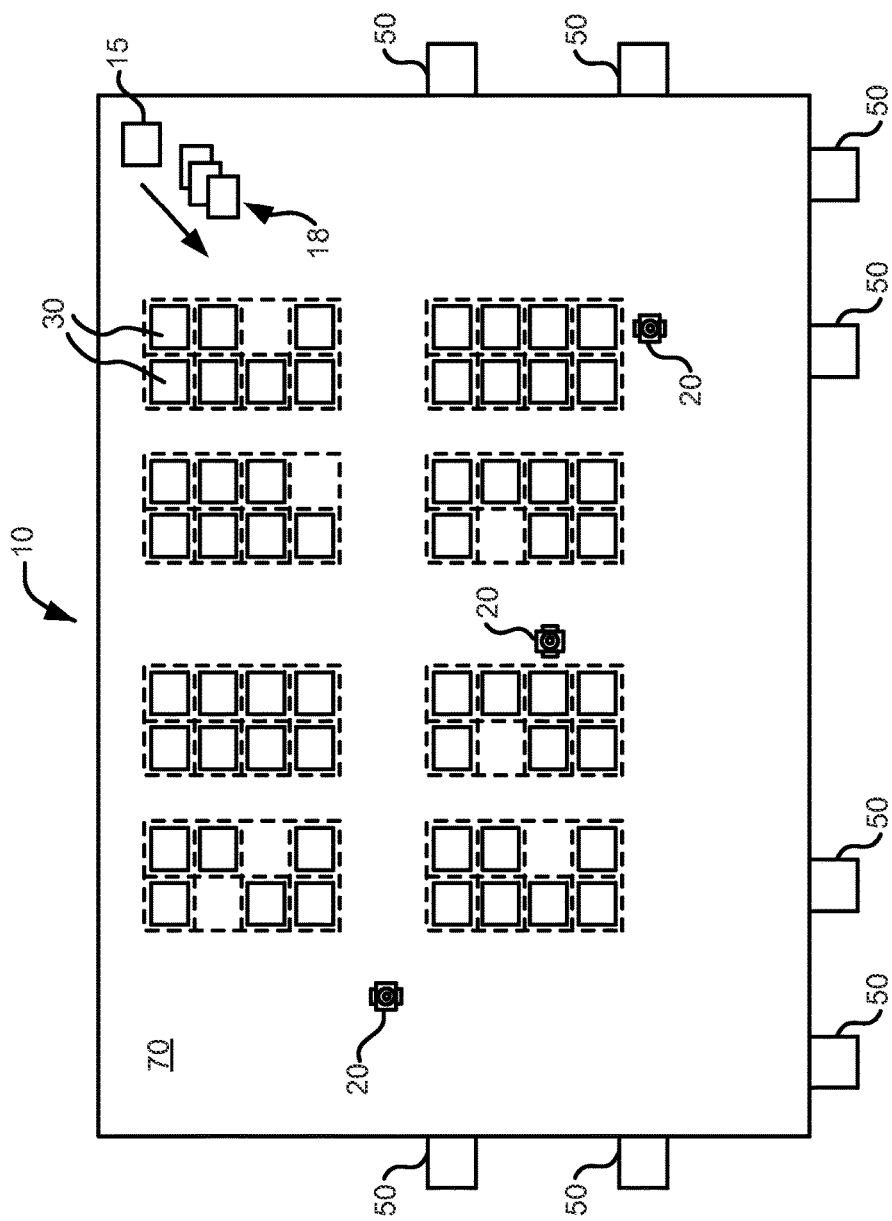
FIG. 2 illustrates components of an inventory system according to at least one embodiment.

FIG. 2 illustrates the components of an inventory system 10 that may be used to implement the techniques described herein. The inventory system 10 may include the management module 15, one or more mobile drive units 20, one or more inventory holders 30, and one or more inventory stations 50. The mobile drive units 20 transport the inventory holders 30 between points within a workspace 70 in response to commands communicated by the management module 15. Each of the inventory holders 30 may be configured with one or more compartments for containing one or more inventory items. In some examples, the inventory holders 30 may be inventory holders configured to hold one or more containers which may hold inventory items. Thus, the inventory system 10 may be capable of moving inventory items between locations within the workspace 70 to facilitate the entry, processing, and/or removal of inventory items from the inventory system 10 and the completion of other tasks involving inventory items.

The management module 15 may assign tasks to appropriate components of the inventory system 10 and coordinate operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20 or other components of the inventory system 10. As a result, any or all of the interaction between a particular mobile drive unit 20 and the management module 15 that is described below may, in particular embodiments, represent peer-to-peer communication between that mobile drive unit 20 and one or more other mobile drive units 20. The components and operation of an example embodiment of the management module 15 are discussed further below with respect to FIG. 3. In some examples, the management module 15 may be distributed between a server and the mobile drive units 20. In this example, the server may provide instructions to the mobile drive units 20 which may process the instructions and generate other instructions to manage components of the mobile drive units 20. In some examples, the management module 15 may include any suitable combination of analog and digital components configured to implement the techniques described herein.

The mobile drive units 20 may move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular embodiment of the inventory system 10, the mobile drive units 20 represent independent, self-powered devices configured to freely move about the workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 20 represent elements of a tracked inventory system configured to move the inventory holders 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10, the mobile drive units 20 may be configured to utilize alternative conveyance equipment to move within the workspace 70 and/or between separate portions of the workspace 70. The components and operation of an example embodiment of a mobile drive unit 20 are discussed further below with respect to FIGS. 7 and 8.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, particular embodiments of the mobile drive unit 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In some examples, the inventory holders 30 may store inventory items within containers. In a particular embodiment, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving the inventory holder 30. In some examples, the inventory holders 30 may store inventory items within one or more storage bins.

Additionally, in particular embodiments, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular embodiment, the inventory holder 30 includes four faces. In such an embodiment, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the inventory system 10.

Inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In particular embodiments, the inventory stations 50 may just represent the physical locations where a particular task involving inventory items can be completed within the workspace 70. In alternative embodiments, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks to inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 2 shows, for the purposes of illustration, an embodiment of the inventory system 10 in which the workspace 70 includes a fixed, predetermined, and finite physical space, particular embodiments of the inventory system 10 may include the mobile drive units 20 and the inventory holders 30 that are configured to operate within a workspace 70 that is of variable dimensions and/or an arbitrary geometry. While FIG. 2 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the management module 15 generates the task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in particular embodiments, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on particular embodiments of the mobile drive unit 20 and the inventory holder 30 that are configured to dock in a particular manner, alternative embodiments of the mobile drive unit 20 and the inventory holder 30 may be configured to dock in any manner suitable to allow the mobile drive unit 20 to move the inventory holder 30 within the workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with the relevant components to ensure the efficient use of space, equipment, manpower, and other resources available to the inventory system 10. As one specific example of such interaction, the management module 15 is responsible, in particular embodiments, for planning the paths the mobile drive units 20 take when moving within the workspace 70 and for allocating use of a particular portion of the workspace 70 to a particular mobile drive unit 20 for purposes of completing an assigned task. In such embodiments, the mobile drive units 20 may, in response to being assigned a task, request a path to a particular destination associated with the task. Moreover, while the description below focuses on one or more embodiments in which the mobile drive unit 20 requests paths from the management module 15, the mobile drive unit 20 may, in alternative embodiments, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits.

Figure 3:
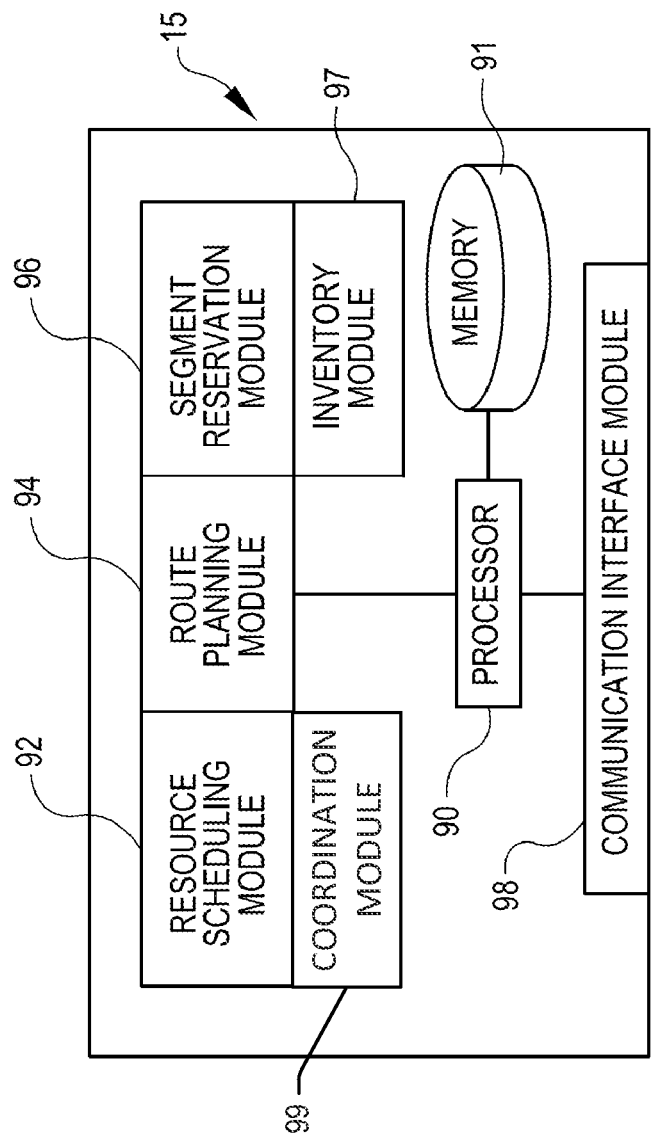
FIG. 3 illustrates in greater detail components of an example management module that may be utilized to implement techniques relating to discrete event-based coordination of mobile drive units as described herein, according to at least one embodiment.

FIG. 3 illustrates in greater detail the components of a particular embodiment of the management module 15. As shown, the example embodiment includes a resource scheduling module 92, a route planning module 94, a segment reservation module 96, an inventory module 97, a coordination module 99, a communication interface module 98, a processor 90, and a memory 91. The management module 15 may represent a single component, multiple components located at a central location within the inventory system 10, or multiple components distributed throughout inventory system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits (ASICs), field programmable gate arrays (FPGAs), digital signal processors (DSPs) and any other suitable specific or general purpose processors.

The memory 91 stores processor instructions, inventory requests, reservation information, state information for the various components of the inventory system 10 and/or any other appropriate values, parameters, or information utilized by the management module 15 during operation. The memory 91 may represent any collection and arrangement of volatile or nonvolatile, local or remote devices suitable for storing data. Examples of the memory 91 include, but are not limited to, random access memory (RAM) devices, read only memory (ROM) devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components. Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98. In some examples, the segment reservation module 96 receives information from the coordination module 99 to decide which segments to reserve.

The inventory module 97 maintains information about the location and number of the inventory items 40 in the inventory system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the inventory system 10.

The coordination module 99 is configured to implement the techniques described herein related to event-based coordination. For example, the coordination module 99 accesses the drive path information 102, the position information 104, and/or the velocity information 106 in order to compute one or more velocity values for the mobile drive units 20. In some examples, the coordination module 99 accesses such information from memory (e.g., the memory 91), from other modules of the management module 15 (e.g., the route planning module 94), as sensing information in streams from the mobile drive units 20, and in any other suitable manner. The coordination module 99 may be configured to perform event-based coordination of many sets of mobile drive units within the workspace 70. For example, the coordination module 99 may divide up the workspace geometrically and compute velocity values in order to avoid potential collision events within the geometric divisions. In some examples, state information that is used to avoid a first potential collision event may be used to compute velocity values to avoid a second potential collision event. In some examples, the potential collision events may be between two or more mobile drive units 20. In some examples, the coordination module 99 may include functionality to score velocity sets based on any suitable scoring metric. Based on the scores of the velocity sets, the coordination module 99 may be configured to select a particular velocity set as the velocity set for a set of mobile drive units 20. In some examples, the coordination module 99 may instruct the mobile drive units 20 to move according to the selected velocity set. In some examples, the coordination module 99 provides the selected velocity set to the mobile drive units 20, which process the velocity set and generate their own instructions.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In particular embodiments, the management module 15 may communicate using communication protocols such as 802.11, Bluetooth, or Infrared Data Association (IrDA) standards. Furthermore, the management module 15 may, in particular embodiments, represent a portion of the mobile drive unit 20 or other components of the inventory system 10. In such embodiments, the communication interface module 98 may facilitate communication between the management module 15 and other parts of the same system component.

In general, the resource scheduling module 92, the route planning module 94, the segment reservation module 96, the inventory module 97, the coordination module 99, and the communication interface module 98 may each represent any appropriate hardware and/or software suitable to provide the described functionality. In addition, as noted above, the management module 15 may, in particular embodiments, represent multiple different discrete components and any or all of the resource scheduling module 92, the route planning module 94, the segment reservation module 96, the inventory module 97, the coordination module 99, and the communication interface module 98 may represent components physically separate from the remaining elements of the management module 15. Moreover, any two or more of the resource scheduling module 92, the route planning module 94, the segment reservation module 96, the inventory module 97, the coordination module 99, and the communication interface module 98 may share common components. For example, in particular embodiments, the resource scheduling module 92, the route planning module 94, the segment reservation module 96, the inventory module 97, and the coordination module 99 represent computer processes executing on the processor 90 and the communication interface module 98 comprises a wireless transmitter, a wireless receiver, and a related computer process executing on the processor 90.

Figure 4:
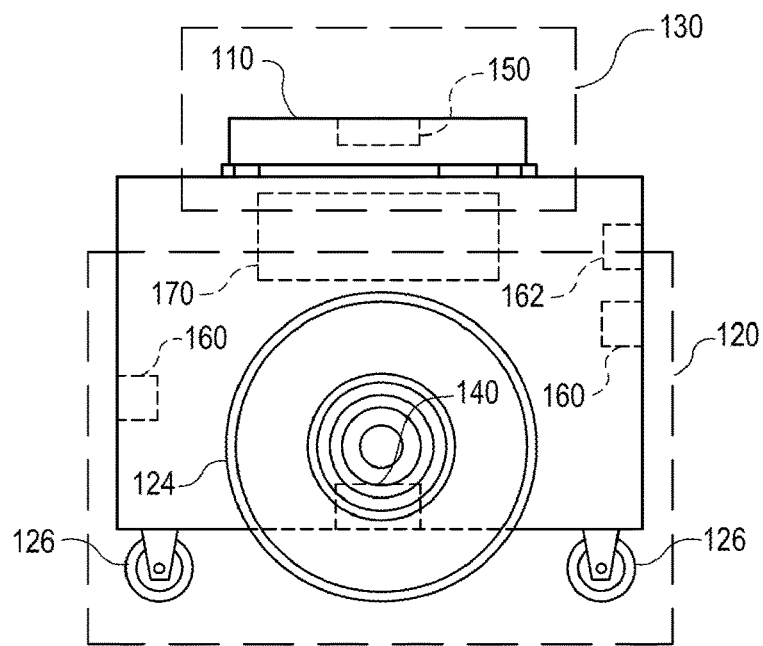
FIGS. 4 and 5 illustrate in greater detail an example mobile drive unit that may be utilized to implement techniques relating to discrete event-based coordination of mobile drive units as described herein, according to at least one embodiment.
Figure 5:
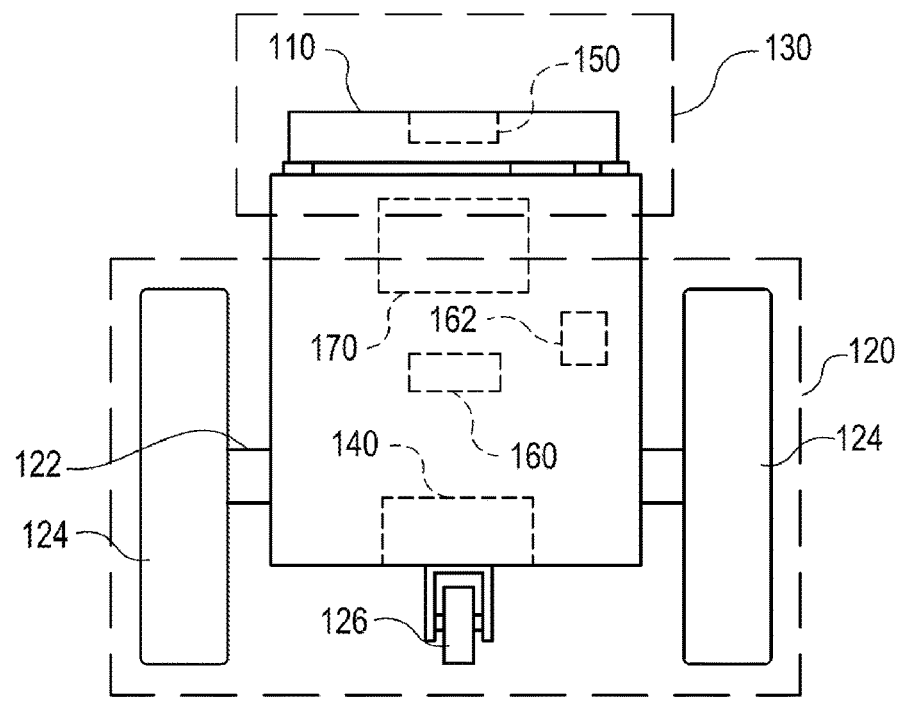

FIGS. 4 and 5 illustrate in greater detail the components of a particular embodiment of the mobile drive unit 20. In particular, FIGS. 4 and 5 include a side and front view of an example mobile drive unit 20. The mobile drive unit 20 includes a platform 110, a drive module 120, a docking head assembly 130, and a control module 170. The platform 110 may be considered a docking head. The docking head assembly 130 may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the inventory system 10. In the illustrated embodiment, the mobile drive unit 20 includes a position sensor 140, a holder sensor 150, an obstacle sensor 160, and an identification signal transmitter 162.

The platform 110, in particular embodiments of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in particular embodiments, the platform 110 may include a high-friction portion that abuts a portion of the inventory holder 30 while the mobile drive unit 20 is docked to the inventory holder 30. In such embodiments, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated embodiment, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130 moves the platform 110 towards the inventory holder 30 to facilitate docking of the mobile drive unit 20 and the inventory holder 30. The docking head assembly 130 may also be capable of adjusting the position or orientation of the platform 110 in other suitable manners to facilitate docking. The docking head assembly 130 may include any appropriate components, based on the configuration of the mobile drive unit 20 and the inventory holder 30, for moving the platform 110 or otherwise adjusting the position or orientation of the platform 110. For example, in the illustrated embodiment, the docking head assembly 130 includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated embodiment, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated embodiment, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in particular embodiments, the workspace 70 associated with the inventory system 10 includes a number of fiducial marks that mark points on a two-dimensional grid that covers all or a portion of the workspace 70. In such embodiments, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In particular embodiments, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in particular embodiments of the inventory system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, the obstacle sensor 160 may also be capable of detecting state information transmitted by the other mobile drive units 20. For example, in particular embodiments, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In particular embodiments, the mobile drive unit 20 may use the state information transmitted by other mobile drive units to avoid collisions when operating in close proximity with those other mobile drive units.

The control module 170 monitors and/or controls operation of the drive module 120 and the docking head assembly 130. The control module 170 may also receive information from sensors such as the position sensor 140 and the holder sensor 150 and adjust the operation of the drive module 120, the docking head assembly 130, and/or other components of the mobile drive unit 20 based on this information. Additionally, in particular embodiments, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In particular embodiments, the control module 170 includes a general-purpose microprocessor programmed to provide the described functionality. Additionally, the control module 170 may include all or portions of the docking head assembly 130, the drive module 120, the position sensor 140, and/or the holder sensor 150, and/or share components with any of these elements of the mobile drive unit 20.

Moreover, in particular embodiments, the control module 170 may include hardware and software located in components that are physically distinct from the device that houses the drive module 120, the docking head assembly 130, and/or the other components of the mobile drive unit 20 described above. For example, in particular embodiments, each mobile drive unit 20 operating in the inventory system 10 may be associated with a software process (referred to here as a "drive agent") operating on a server that is in communication with the device that houses the drive module 120, the docking head assembly 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking head assembly 130, and the other appropriate components of the mobile drive unit 20. As a result, for the purposes of this description and the claims that follow, the term "mobile drive unit" includes software and/or hardware, such as agent processes, that provides the described functionality on behalf of the mobile drive unit 20 but that may be located in physically distinct devices from the drive module 120, the docking head assembly 130, and/or the other components of the mobile drive unit 20 described above.

While FIGS. 4 and 5 illustrate a particular embodiment of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 6:
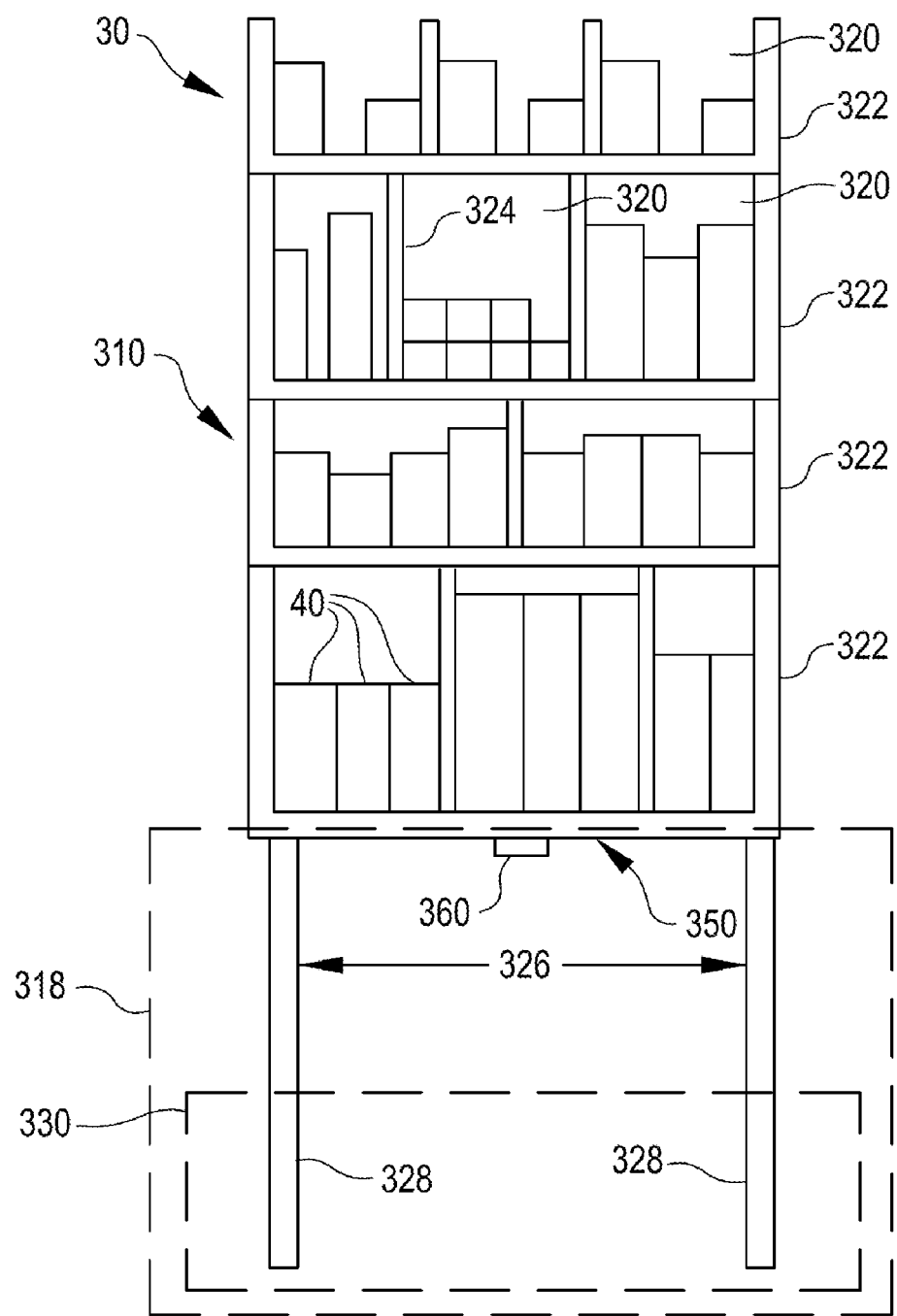
FIG. 6 illustrates in greater detail an example inventory holder that may be utilized to implement techniques relating to discrete event-based coordination of mobile drive units as described herein, according to at least one embodiment.

FIG. 6 illustrates in greater detail the components of a particular embodiment of the inventory holder 30. In particular, FIG. 6 illustrates the structure and contents of one side of an example inventory holder 30. In a particular embodiment, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular embodiment, the frame 310 is composed of a plurality of trays 322 stacked upon one another and attached to or stacked on a base 318. In such an embodiment, the inventory bins 320 may be formed by a plurality of adjustable dividers 324 that may be moved to resize one or more inventory bins 320. In alternative embodiments, the frame 310 may represent a single inventory bin 320 that includes a single tray 322 and no adjustable dividers 324. Additionally, in particular embodiments, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular embodiment, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular embodiment of the mobile drive unit 20 and/or the inventory holder 30 utilized by the inventory system 10. For example, in the illustrated embodiment, the frame 310 includes four legs 328 that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in particular embodiments, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. Additionally, in particular embodiments, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in particular embodiments, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in particular embodiments, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the inventory system 10, the mobile drive unit 20 may move the inventory holder 30 using a variety of appropriate methods. In a particular embodiment, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in particular embodiments, the inventory system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

Figure 7:
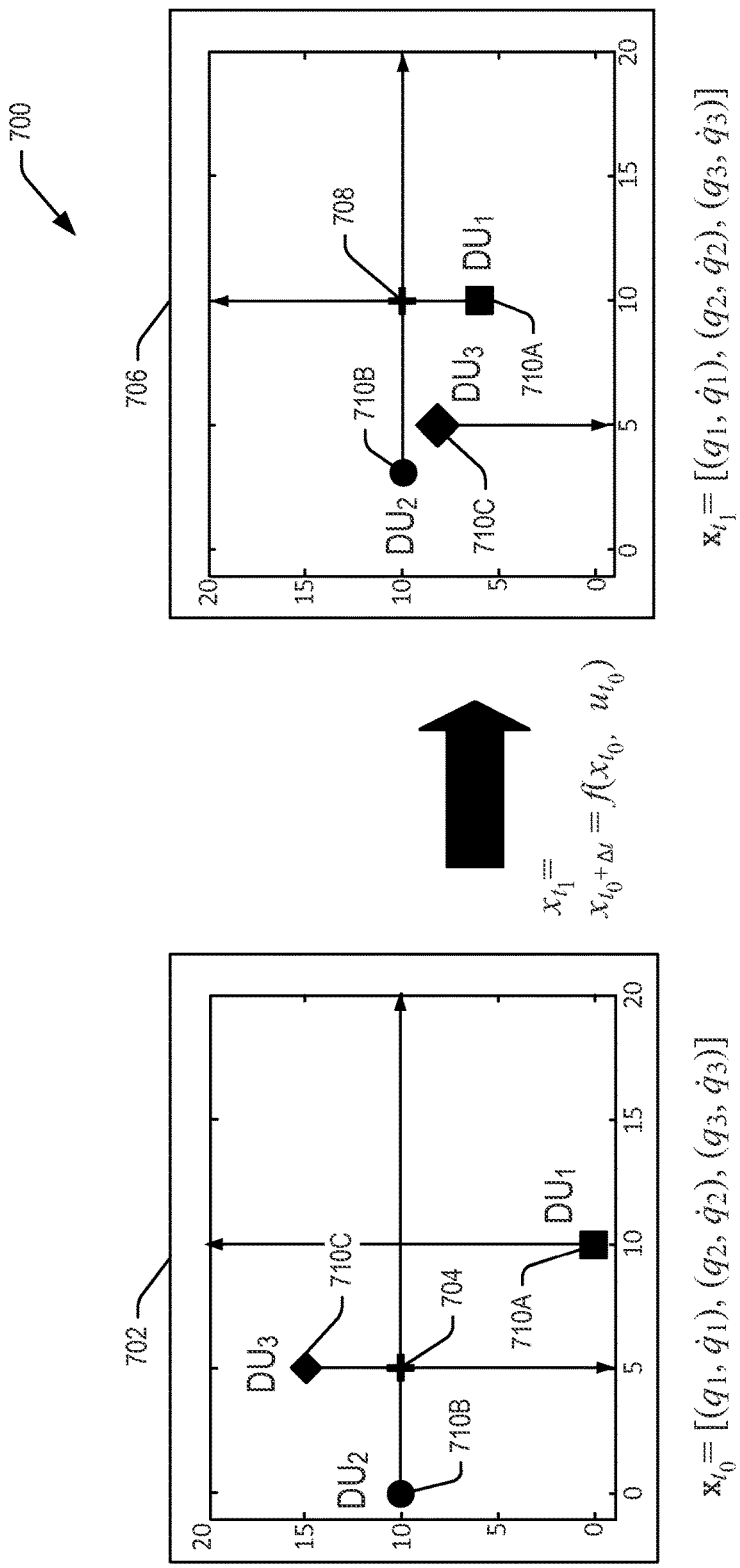
FIG. 7 illustrates a diagram depicting a transition between two discrete event states in the context of techniques relating to the discrete event-based coordination of mobile drive units as described herein, according to at least one embodiment.

As introduced above, embodiments herein are directed to an inventory system having multiple inventory holders and drive units for moving the inventory holders. In particular, operation of the mobile drive units within the inventory system may be managed using discrete event-based coordination techniques. Discrete event-based coordination may be utilized at discrete event states to resolve potential collision events at intersection points of drive paths of the mobile drive units. FIG. 7 illustrates a discrete event state transition flow 700. The discrete event state transition flow 700 may include a first representation 702 of a first potential collision event 704 and a second representation 706 of a second potential collision event 708. Both of the representations 702 and 706 may geographically represent a portion of the workspace 70. In the event state transition flow 700, each of the representations 702 and 706 may represent a twenty unit by twenty unit space. Each of the representations 702 and 706 may include a first mobile drive unit 710A, a second mobile drive unit 710B, and a third mobile drive unit 710C disposed at different positions within the representations 702 and 706. In some examples, the mobile drive units 710A-710C are examples of the mobile drive units 20.

In accordance with techniques relating to discrete event-based coordination, each of the mobile drive units 710A-710C (and mobile drive units in corresponding figures) may be represented as a Newtonian point mass in a one-dimensional space with $\ddot{q}=u$ dynamics. For example, acceleration may be represented as $\ddot{q}=u$, speed may be represented as $\dot{q}=\dot{q}(0)+u\Delta t$, and position along a path may be represented as $q=q(0)+\dot{q}(0)\Delta t+\frac{1}{2}\Delta t^2 u$. In this manner, the position of any mobile drive unit at specific time t may be determined based on an initial position and a velocity. In some examples, potential collision events of two or more mobile drive units may be determined based on initial positions, drive paths, and velocities. For example, as illustrated below the first representation 702, at time=0, the first potential collision event 704 of the mobile drive units 710A-710C may be determined based on their initial positions (e.g., $q_1$, $q_2$, $q_3$) and their initial speeds (e.g., $\dot{q}_1$, $\dot{q}_2$, $\dot{q}_3$) along their paths. An intersection of paths of two drives may represent a potential collision event if the time $t_{CPA}$ to the closest point of approach (CPA) (refers to positions of two moving drives at their closest possible distance given their initial positions and velocities) is below a user-specified threshold $t_{CPA,max}$. In general, the CPA may be represented as $$t_{CPA} = \frac{(p_1 - p_2) \cdot (v_1 - v_2)}{\|v_1 - v_2\|^2}$$

for a straight segment of the path, where $p_1$ and $p_2$ are two-dimensional positions of mobile drive unit 1 and the mobile drive unit 2, respectively, and $v_1$ and $v_2$ are their velocities. The dot in the numerator represents a symbol for the dot product.

Using techniques described herein, the first potential collision event 704 may be resolved in a manner that avoids a potential collision of the second mobile drive unit 710B and the third mobile drive unit 710C. Once the first potential collision event 704 is resolved, states of the mobile drive units 710A-710C represented in the representation 702 may be projected in one discrete event state transition step to a later time represented by the second representation 706. This discrete projection may be a function of initial location and acceleration and is performed in a manner that is computationally efficient. This may be because this discrete projection between two discrete event states (i.e., for the transition between $X_{t0}$ and $X_{t1}$) and because the process of generating combinations of potential yield rules, their evaluation, computation of sets of velocities, and score assignment can be parallelized.

As illustrated below the second representation 706, at time=1, the location of the second potential collision event 708 of the mobile drive units 710A-710C may be a product of their later positions (e.g., $q_1$, $q_2$, $q_3$) and later initial speeds (e.g., $\dot{q}_1$, $\dot{q}_2$, $\dot{q}_3$). In this manner, the information used to compute velocities to avoid the first potential collision event 704 are used as inputs to compute velocities to avoid the second potential collision event 708.

While the potential collision events 704 and 708 are illustrated as potential side-on collisions with the drive paths intersecting perpendicularly, other potential collision events from drive paths that are parallel to each other, including potential head-on collisions and potential rear-end collisions, may also be avoided using the techniques described herein.

Figure 8:
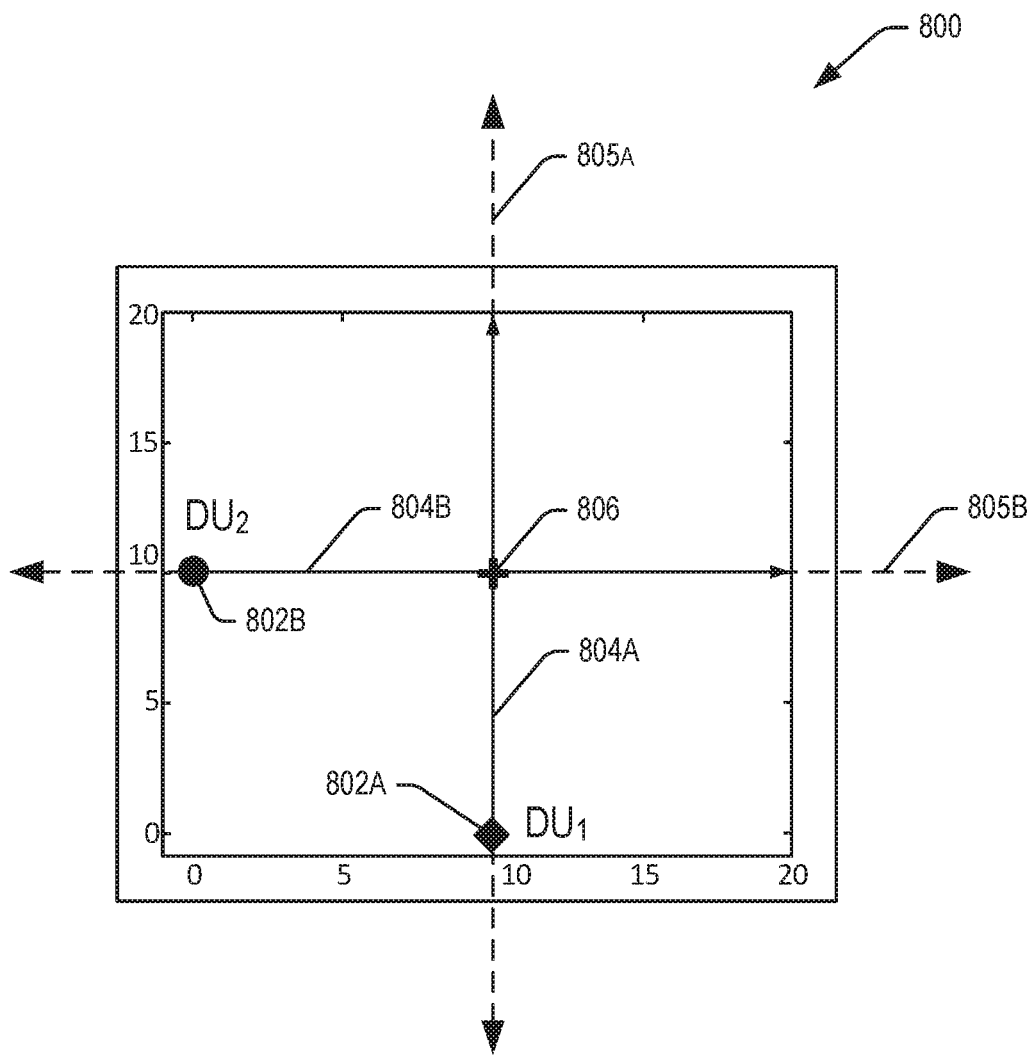
FIG. 8 illustrates a diagram depicting a potential collision event in the context of techniques relating to discrete event-based coordination of mobile drive units as described herein, according to at least one embodiment.

FIG. 8 illustrates a graphical representation 800 of states of a first mobile drive unit 802A and a second mobile drive unit 802B along respective drive paths 804A and 804B. The mobile drive units 802A and 802B are examples of the mobile drive units 20. In some examples, the states of the mobile drive units 802A and 802B may be considered initial discrete event states prior to the drive paths 804A and 804B intersecting at an intersection 806. As illustrated, the drive paths 804A and 804B may extend along and/or be aligned with respective axes 805A and 805B. The axes 805 may be oriented differently with respect to each other. In some examples, the intersection 806 may also be considered a location of a potential collision event if the states of the mobile drive units 802A and 802B indicate such. In other words, a potential collision may take place between the first mobile drive unit 802A and the second mobile drive unit 802B at the intersection 806 when, based on the initial velocities and initial locations of the mobile drive units 802A and 802B, it is determined that the mobile drive units 802A and 802B are planned to arrive at the intersection 806 at about the same time (e.g., within a range of 0.1 second to 1.5 seconds) or within some threshold distance of each other (e.g., 0.1 meter). In particular, a collision may occur if the distance $d_{CPA}(p_{1,t_{CPA}}, p_{2,t_{CPA}}) = \|p_{1,t_{CPA}} - p_{2,t_{CPA}}\|$ between the drives at CPA is below a user-specified threshold $d_{CPA,min}$. Here $p_{1,t_{CPA}} = p_1 + t_{CPA} v_1$ and $p_{2,t_{CPA}} = p_2 + t_{CPA} v_2$ are the forward projected two-dimensional positions of the mobile drive unit 802A and the mobile drive unit 802B at $t_{CPA}$, respectively. In some examples, any contact between the mobile drive units 802A and 802B may be considered a collision. On the other hand, it may be desirable to coordinate the mobile drive units 802A and 802B to clear intersections in an efficient manner that leaves only a slim margin between contact and no contact.

In some examples, a particular discrete event-based coordination technique, according to at least one example, may be used to avoid a potential collision at the intersection 806 of the mobile drive units 802A and 802B. This particular coordination technique will be explained with reference to FIG. 9. Other figures include other flow charts illustrating other related techniques.

In particular, FIGS. 9, 11, 12, and 18 illustrate example flow diagrams showing respective processes 900, 1100, and 1800, as described herein. These processes 900, 1100, and 1800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 9:
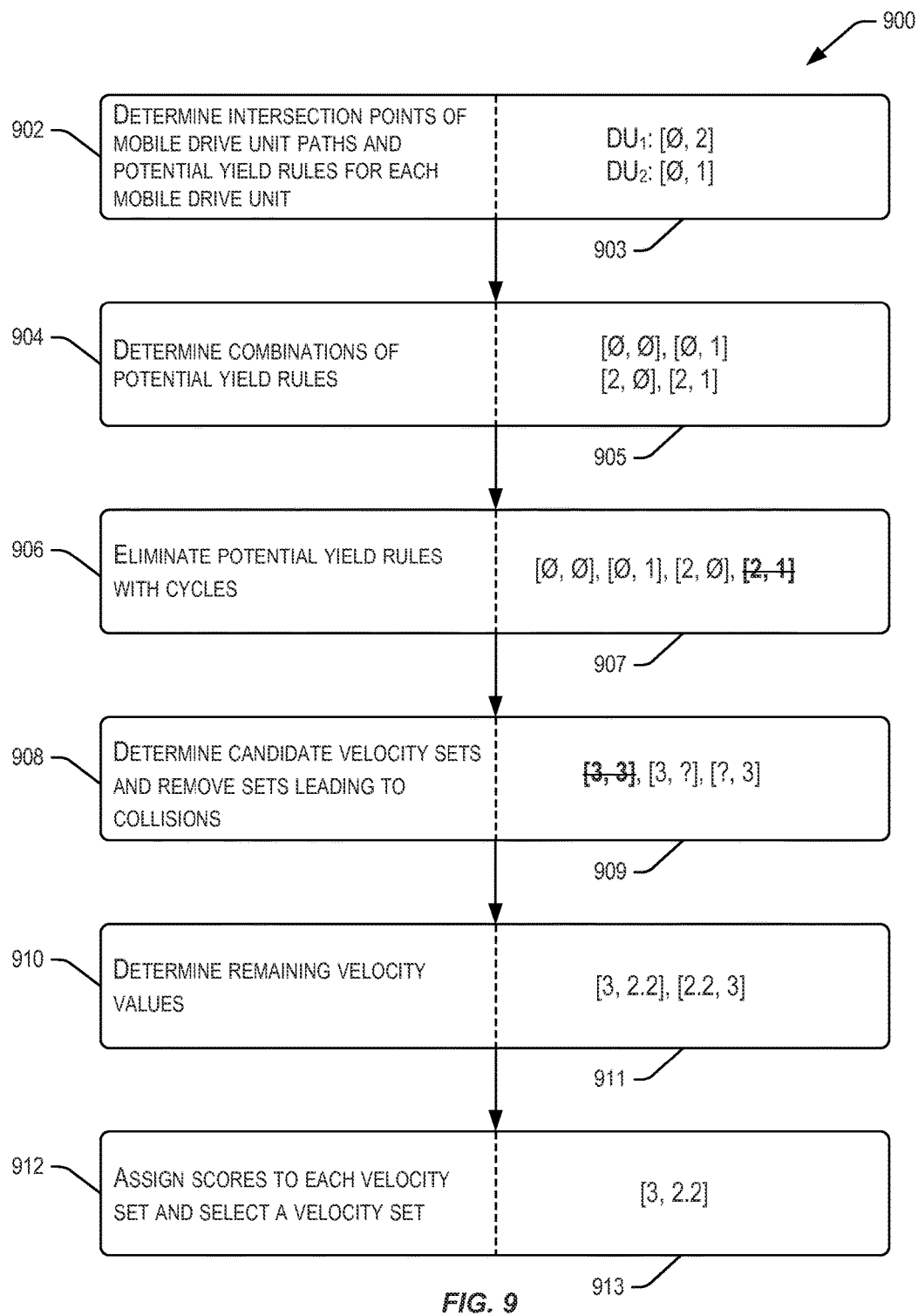
FIG. 9 illustrates a flow diagram depicting example acts for implementing techniques relating to discrete event-based coordination of mobile drive units as described herein, according to at least one embodiment.

In particular, FIG. 9 depicts the process 900 including example acts and/or procedures relating to event-based coordination of mobile drive units in accordance with at least one example. The management module 15 (FIG. 3) may perform the process 900 of FIG. 9. The process 900 may include example functions aligned on the left side of the boxes and example representations of the example functions aligned on the right side of the boxes. The process 900 begins at 902 by determining intersection points of mobile drive units and potential yield rules for each mobile drive unit. In some examples, determining the intersection points of the mobile drive units and the potential yield rules for each mobile drive unit may be performed by the coordination module 99 (FIG. 2). Determining the intersection points may include accessing a first path of a first mobile drive unit and a first initial location of the first mobile drive unit along the first path and accessing a second path of a second mobile drive unit and a second initial location of the second mobile drive unit along the second path. Determining the intersection points may include computing the intersection points based at least in part on the initial locations and initial velocities corresponding to the mobile drive units at the initial locations. The intersection points may be computed using any suitable technique described herein or known to a person of ordinary skill in the art. Determining the potential yield rules for each mobile drive unit may include representing the potential yield rules as sets corresponding to each of the mobile drive units. As illustrated in area 903, for example, the representation $DU_1$: [Ø, 2] may represent that the first mobile drive unit may either not yield to the second mobile drive unit (represented by "Ø") or yield to the second mobile drive unit (represented by "2").

At 904, the process 900 determines combinations of potential yield rules. In some examples, determining combinations of potential yield rules may be performed by the coordination module 99. Determining the combinations of the potential yield rules may include identifying possible combinations of yielding and not yielding for the first mobile drive unit and the second mobile drive unit based on the potential yield rules identified at 902. As illustrated in area 905, for example, four combinations of potential yield rules may be computed. In some examples, each potential yield rule may indicate that, prior to arriving at the intersection point, neither the first mobile drive unit nor the second mobile drive unit yields (i.e., [Ø, Ø]), the second mobile drive unit yields to the first mobile drive unit (i.e., [Ø, 1]), the first mobile drive unit yields to the second mobile drive unit (i.e., [2, Ø]), or the first mobile drive unit and the second mobile drive unit both yield (i.e., [2, 1]).

At 906, the process 900 eliminates potential yield rules with cycles. In some examples, eliminating potential yield rules with cycles may be performed by the coordination module 99. Eliminating the potential yield rules may include eliminating rules that would lead to two or more mobile drive units yielding. As illustrated in area 907, for example, one combination of potential yield rules may be eliminated (i.e., [2, 1] which dictates the first drive unit to yield to the second one and the second drive unit to yield to the first one). In some examples, greater or fewer combinations may be eliminated.

At 908, the process 900 determines candidate velocity sets and removes sets leading to collisions. In some examples, determining candidate velocity sets and removing sets leading to collisions may be performed by the coordination module 99. Determining the candidate velocity sets may include determining based at least in part on the set of potential yield rules. In some examples, each candidate velocity set may include at least one velocity value applicable to at least one of the first mobile drive unit or the second mobile drive unit. For example, if a yield rule indicates that only the second mobile drive unit is to yield to the first mobile drive unit, the velocity for the first mobile drive unit may remain as the initial first velocity (e.g., 3 m/s), while the other velocity may be determined later for the second mobile drive unit. Thus, as illustrated in area 909, for example, the candidate velocity sets include known and unknown velocity values (i.e., [3, ?] and [?, 3]). In some examples, removing candidate velocity sets may include removing those sets that, based on the set of potential yield rules, will result in a collision. In some examples, these may be candidate velocity sets where neither mobile drive unit yields. Thus, as illustrated in the area 909, for example, one candidate velocity set ([3, 3]) is shown being removed.

At 910, the process 900 determines remaining velocity values. In some examples, determining the remaining velocity values may be performed by the coordination module 99.

Determining the remaining velocity values may include computing velocity values that correspond to the unknown velocity values within the candidate velocity sets determined at 908. In some examples, the remaining velocity values may be computed in a manner that results in the first mobile drive unit and the second mobile drive unit avoiding a collision at the intersection. In some examples, this may include a velocity that is smaller than the initial velocity or higher than the initial velocity. In some examples, determining the remaining velocity values may include using one or more projection equations to select a velocity that will place the particular mobile drive unit 1 at the minimum allowable distance $d_{col,min}(p_{1,t_{col,min}}, p_{2,t_{col,min}}) = \|p_{1,t_{col,min}} - p_{2,t_{col,min}}\|$ from the drive unit 2 at a time $t_{col,min}$ shortly after it has passed by the intersection. Here, $p_{1,t_{col,min}} = p_1 + t_{col,min} v_1$ and $p_{2,t_{col,min}} = p_2 + t_{col,min} v_2$ are the projected positions of the mobile drive unit 1 and the mobile drive unit 2 at the time $t_{col,min}$, respectively, $p_1$ and $p_2$ are their initial positions, and $v_1$ and $v_2$ are their velocities. The time to the projected positions of the drive units at $t_{col,min}$ may be determined as $$t_{col,min} = \frac{(p_1 - p_2) \cdot (v_1 - v_2)}{\|v_1 - v_2\|^2}.$$

In this manner, a collision may be potentially avoided. Thus, as illustrated in the area 911, for example, two candidate velocity sets ([3, 2.2] and [2.2, 3]) are shown having been fully determined.

At 912, the process 900 may assign scores to each velocity set and select a velocity set. In some examples, assigning scores and selecting the velocity set may be performed by the coordination module 99. Assigning scores may include scoring each of the candidate velocity set according to one or more scoring metrics. For example, the one or more scoring metrics may include a time of arrival metric, an energy expenditure metric, a component wear metric, a stability metric, a jerk metric, an acceleration metric, and any other suitable metric.

The time of arrival metric may consider the time it takes for the mobile drive units to reach their destinations. For example, this metric may score velocity sets higher if they minimize the amount of time for a particular mobile drive unit to reach its destination or for a set of mobile drive units to reach their destinations. In some examples, this metric considers the total amount of time for all mobile drive units to reach their destinations.

The energy expenditure metric may seek to minimize the amount of energy consumed by one or more mobile drive units. For example, this metric may favor velocity profiles (and possibly acceleration profiles) that are smooth and do not require spikes in energy use. To evaluate this metric, energy information (e.g., force, torque, efficiencies, battery life, and any other information related to energy) may be provided by the mobile drive units or collected from a system that is in communication with the mobile drive units.

The component wear metric may seek to minimize wear on physical components (e.g., brakes, tires, motors, servos, actuators, and the like) of a mobile drive unit or a set of mobile drive units. For example, routes that include excessive starts and stops may cause certain components to wear out more quickly than routes with fewer starts and stops. This metric, therefore, favors velocities that prolong the life of physical components of the mobile drive units.

The stability metric may seek to maximize stability of mobile drive units when coupled to inventory holders. When a mobile drive unit is coupled to an inventory holder, the mobile drive unit may become less stable because a center of the gravity of the combination of the mobile drive unit and the inventory holder is located above the mobile drive unit. This metric, therefore, may favor velocities that result in the inventory holder being more stable than compared to other velocities.

The jerk metric may seek to minimize aggressive and/or jerky movements of a mobile drive unit or a set of the mobile drive units. This metric may directly correlate the amount of inventory lost in the workspace. Such inventory may fall out of the inventory holders as they move throughout the workspace. If the movement of the mobile drive units is less aggressive, fewer inventory items are likely to fall out of the inventory holder.

The acceleration metric may seek to select velocities that can have smooth accelerations between them. This may include velocities that minimize the difference between initial velocities and computed velocities.

Once the scores have been assigned to each of the velocity sets, a particular velocity set may be selected. This may include ranking the velocity sets based on their scores and selecting the velocity set with the best score. In some examples, more than one metric is evaluated, which may result in one or more scores. Each score may be weighted in order to produce a compound score. Selecting the velocity set may be based on the compound score. As illustrated in area 913, for example, a velocity set ([3, 2.2]) is shown as having been selected.

Figure 10:
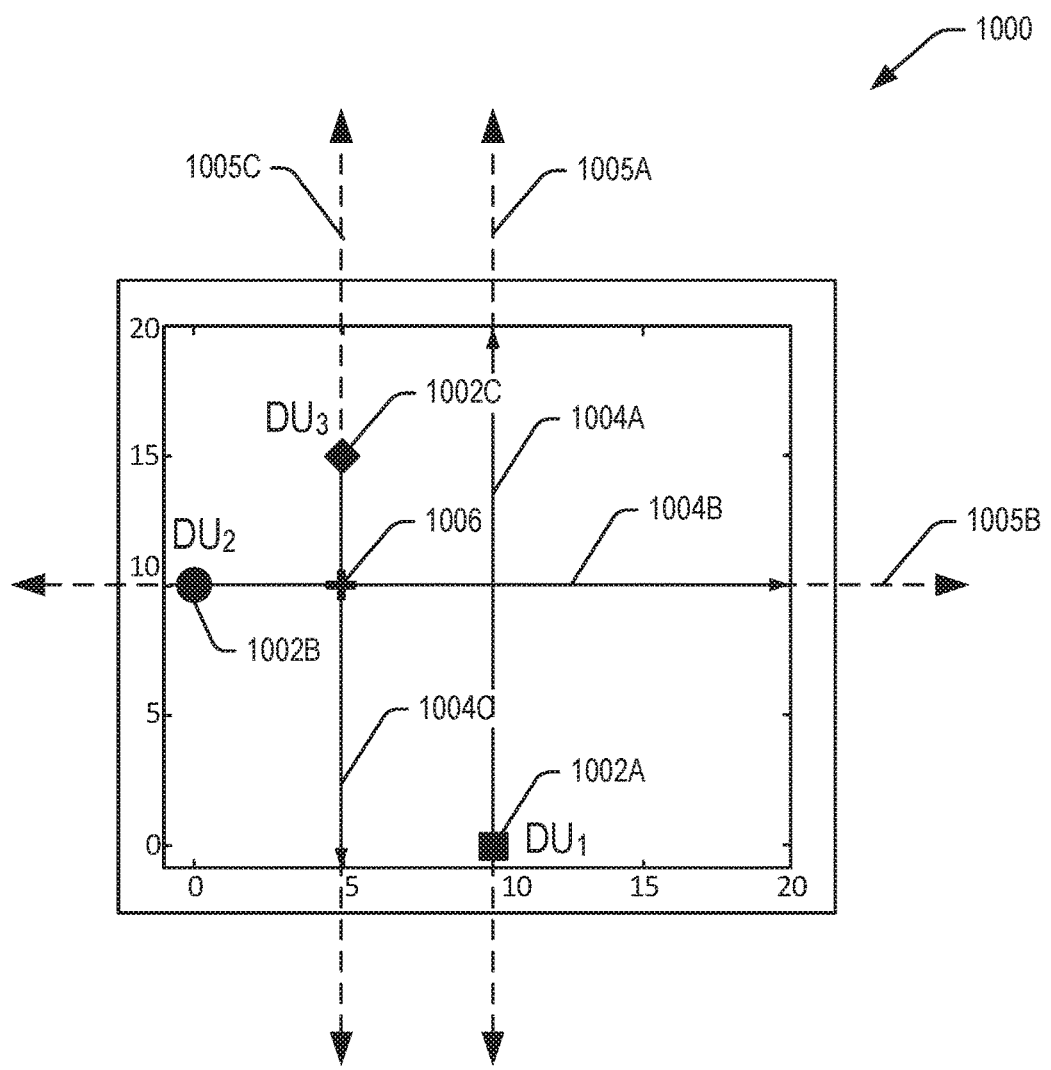
FIG. 10 illustrates a diagram depicting potential collision events in the context of techniques relating to discrete event-based coordination of mobile drive units as described herein, according to at least one embodiment.

FIG. 10 illustrates a first graphical representation 1000 of states of a first mobile drive unit 1002A, a second mobile drive unit 1002B, and a third mobile drive unit 1002C along respective drive paths 1004A, 1004B, and 1004C. The mobile drive units 1002A, 1002B, and 1002C are examples of the mobile drive units 20. Like the graphical representation 800, in some examples, the first graphical representation 1000 may represent initial states of the mobile drive units 1002A, 1002B, and 1002C prior to the drive paths 1004B and 1004C intersecting at a first intersection 1006. As illustrated, the drive paths 1004A, 1004B, and 1004C may extend along and/or be aligned with respective axes 1005A, 1005B, and 1005C. The axes 1005 may be oriented differently with respect to each other. In some examples, the first intersection 1006 may also be considered a location of a first potential collision event if the states of the mobile drive units 1002B and 1002C indicate such. In other words, a first potential collision may take place between the second mobile drive unit 1002B and the third mobile drive unit 1002C at the first intersection 1006 when, based on the initial velocities and initial locations of the mobile drive units 1002B and 1002C, it is determined that the mobile drive units 1002B and 1002C are planned to arrive at the first intersection 1006 at about the same time, as described herein. In some examples, any contact between the mobile drive units 1002B and 1002C may be considered a collision.

In some examples, a particular discrete event-based coordination technique, according to at least one example, may be used to avoid a potential collision at the first intersection 1006 of the mobile drive units 1002B and 1002C. This technique may also consider the first mobile drive unit 1002A. This particular coordination technique may be explained with reference to process 1100 that is described with reference to FIGS. 11 and 12.

Figure 11:
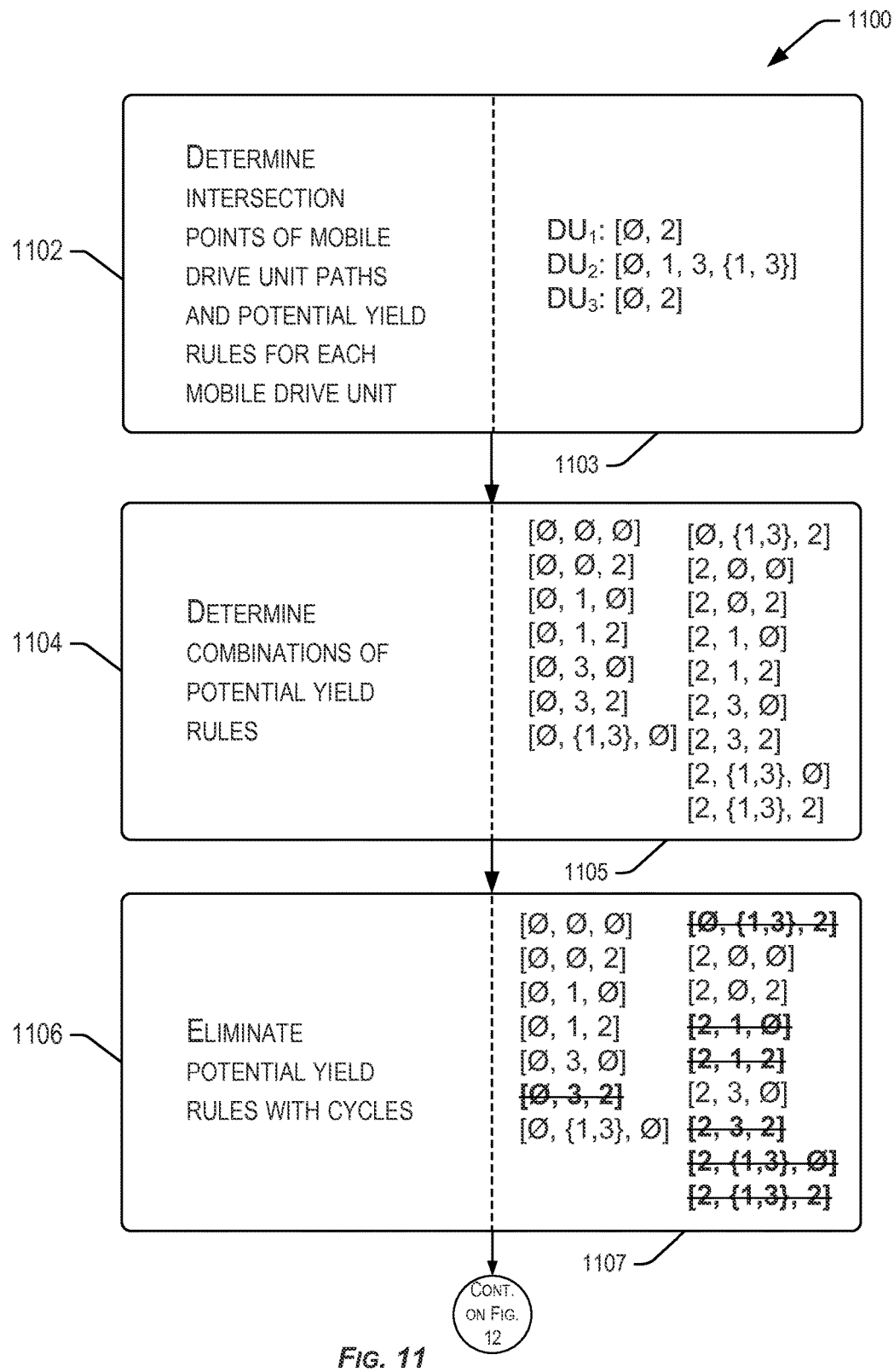
FIG. 11 illustrates a first portion of a flow diagram depicting example acts for resolving a first potential collision event in the context of implementing techniques relating to discrete event-based coordination of mobile drive units as described herein, according to at least one embodiment.
Figure 12:
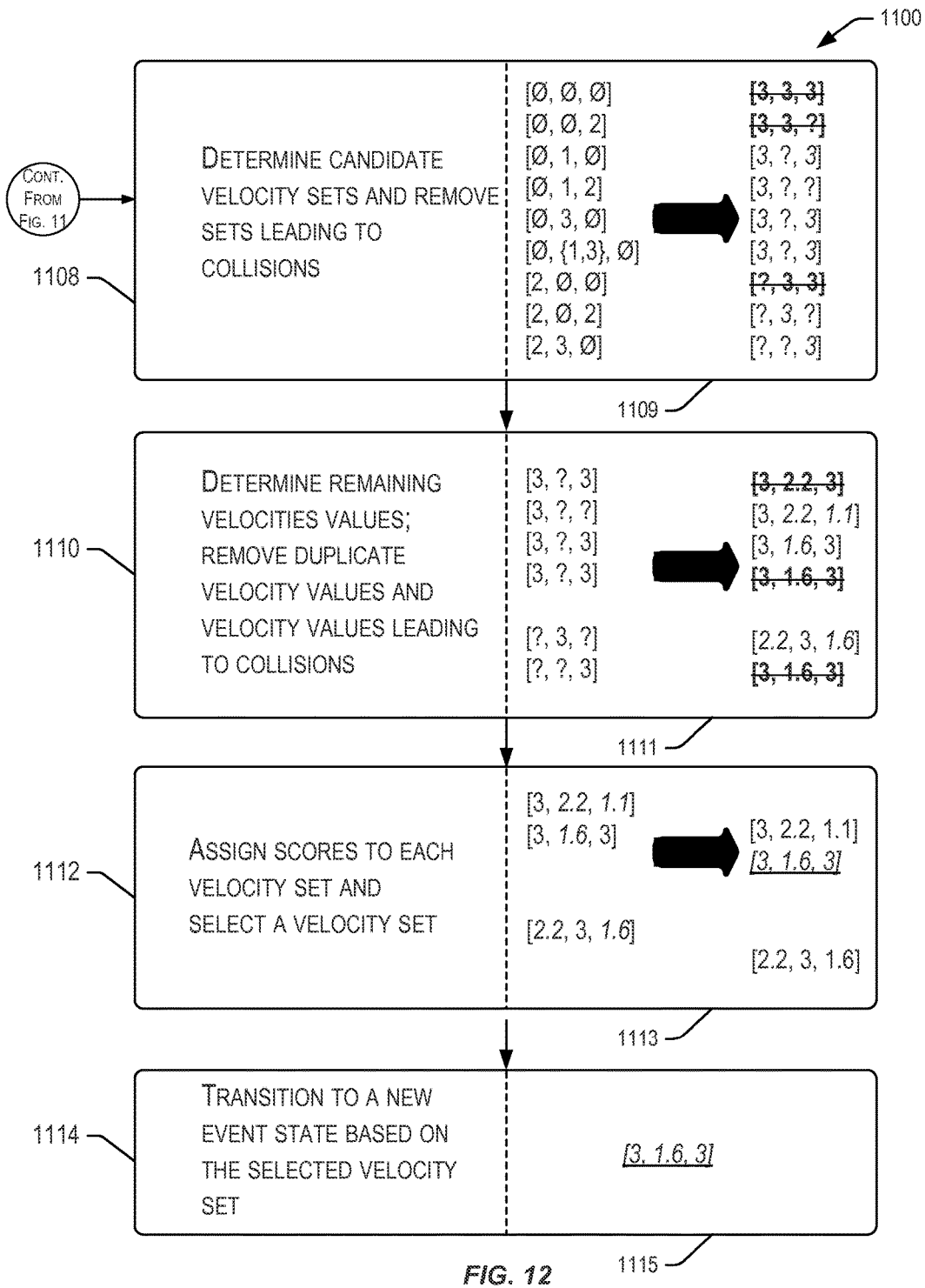
FIG. 12 illustrates a second portion of a flow diagram depicting example acts for resolving a first potential collision event in the context of implementing techniques relating to discrete event-based coordination of mobile drive units as described herein, according to at least one embodiment.

In particular, FIGS. 11 and 12 depict the process 1100 including example acts and/or procedures relating discrete event-based coordination of mobile drive units in accordance with at least one example. The management module 15 (FIG. 3) may perform the process 1100. The process 1100 may include example functions aligned on the left side of the boxes and example representations of the example functions aligned on the right side of the boxes. The process 1100 may perform operations similar to those performed in the process 900. However, the process 1100 may consider three or more mobile drive units, while the process 900 considered two mobile drive units.

The process 1100 begins at 1102 by determining intersection points of mobile drive unit paths and potential yield rules for each mobile drive unit. In some examples, determining the intersection points of the mobile drive unit paths and the potential yield rules for each mobile drive unit may be performed by the coordination module 99 (FIG. 2). Determining the intersection points may include computing the intersection points based at least in part on initial locations and initial velocities corresponding to the mobile drive units at the initial locations. The intersection points may be computed using any suitable technique described herein or known to a person of ordinary skill in the art. Determining the potential yield rules for each mobile drive unit may include representing the potential yield rules as sets corresponding to each of the mobile drive units. As illustrated in area 1103, for example, the representation $DU_1$: [Ø, 2] represents that the first mobile drive unit ($DU_1$) has two options for yielding to the second mobile drive unit. This is because the first mobile drive unit only has one potential collision event which is at a second intersection and is between the first mobile drive unit and the second mobile drive unit. A first option is for the first mobile drive unit to not yield to the second mobile drive unit (represented by "Ø" being in a first position). A second option is for the first mobile drive unit to yield to the second mobile drive unit (represented by "2" being in a second position). As an additional example, the representation $DU_2$: [Ø, 1, 3, {1, 3}] represents that the second mobile drive unit has four options for yielding to first mobile drive unit and the third mobile drive unit. This is because the second mobile drive unit has two potential collision events, a first of which is at the first intersection with the third mobile drive unit and a second of which is at the second intersection with the first mobile drive unit. A first option is for the second mobile drive unit to not yield at all (represented by "Ø"). A second option is for the second mobile drive unit to yield only to the first mobile drive unit (represented by the "1"). A third option is for the second mobile drive unit to yield only to the third mobile drive unit (represented by the "3"). A fourth option is for the second mobile drive unit to yield to both the first mobile drive unit and the third mobile drive unit (represented by the "{1, 3}").

At 1104, the process 1100 determines combinations of potential yield rules. In some examples, determining combinations of potential yield rules may be performed by the coordination module 99. Determining the combinations of the potential yield rules may include identifying possible combinations of yielding and not yielding for the first mobile drive unit, the second mobile drive unit, and the third mobile drive unit based on the potential yield rules identified at 1102. As illustrated in area 1105, for example, sixteen combinations of potential yield rules may be computed. For example, [Ø, Ø, Ø] represents a combination of potential yield rules that requires none of the mobile drive units yield to each other. This combination is based on "Ø" being the first digit in each of the potential yield rules identified at 1102. As an additional example, [2, {1,3}, Ø] represents a combination of potential yield rules that may require the first mobile drive unit to yield to the second mobile drive unit (represented by the "2" being in a first position), the second mobile drive unit to yield to both the first and third mobile drive units (represented by the "{1,3}" being in a second position), and the third mobile drive unit to not yield (represented by the "Ø" being in a third position).

At 1106, the process 1100 eliminates potential yield rules with cycles. In some examples, eliminating potential yield rules with cycles may be performed by the coordination module 99. Eliminating the potential yield rules may include eliminating rules that would lead to two or more mobile drive units yielding to each other, which would lead to a cycle. For example, the combination [2, {1,3}, Ø] discussed above with reference to 1104 is eliminated at 1106 because this potential yield rule may require the second mobile drive unit to yield to the first mobile drive unit (represented by the "1" in the second position) and the first mobile drive unit to yield to the second mobile drive unit (represented by the "2" in the first position). As illustrated in area 1107, for example, seven combinations of potential yield rules may be eliminated. In some examples, greater or fewer combinations may be eliminated.

Turning now to FIG. 12, at 1108, the process 1100 determines candidate velocity sets and removes sets leading to collisions. In some examples, determining candidate velocity sets and removing sets leading to collisions may be performed by the coordination module 99. Determining the candidate velocity sets may include determining based at least in part on the set of potential yield rules. In some examples, each candidate velocity set may include at least one velocity value applicable to at least one of the first mobile drive unit, the second mobile drive unit, and/or the third mobile drive unit. For example, if a yield rule indicates that only the second mobile drive unit is to yield to the first mobile drive unit, the velocity for the first mobile drive unit may remain as the initial first velocity (e.g., 3 m/s), while the other velocity may be determined later for the second mobile drive unit. Thus, as illustrated in area 1109, for example, the candidate velocity sets include known and unknown velocity values (in the right column). In some examples, removing candidate velocity sets may include removing those sets that, based on the set of potential yield rules, will result in a collision. In some examples, these may be candidate velocity sets where neither mobile drive unit yields. Thus, as illustrated in the area 1109, for example, three candidate velocity sets are shown being removed (in the right column).

At 1110, the process 1100 determines remaining velocity values and removes velocity values leading to collisions and duplicates. In some examples, determining the remaining velocity values may be performed by the coordination module 99. Determining the remaining velocity values may include computing velocity values that correspond to the unknown velocity values within the candidate velocity sets determined at 1108. The computation of these values may be based on the yield rules as determined by 1107. In some examples, the remaining velocity values may be computed in a manner that results in the second mobile drive unit and the third mobile drive unit avoiding a collision at the first intersection. In some examples, this may include a velocity that is slower than the initial velocity or faster than the initial velocity. In some examples, determining the remaining velocity values may include using one or more projection equations to select a velocity that will place the particular mobile drive unit at the intersection at a time shortly after the other mobile drive units have passed by the intersection, as described herein. In this manner, a collision may be potentially avoided. Thus, as illustrated in the area 1111, for example, six candidate velocity sets are shown having been fully determined (in the right column). Removing velocity values leading to collisions and duplicates may be represented in the area 1111, for example, as the three velocity sets that have been stricken (in the right column).

At 1112, the process 1100 assigns scores to each of velocity sets and selects a velocity set. In some examples, assigning scores and selecting the velocity set may be performed by the coordination module 99. Assigning scores may include scoring each of the candidate velocity sets according to one or more search strategies based on one or more scoring metrics and assigning the relevant score to the candidate velocity set. For example, the one or more scoring metrics may include a time of arrival metric, an energy expenditure metric, a component wear metric, a stability metric, a jerk metric, an acceleration metric, and any other suitable metric.

Once the scores have been assigned to each of the velocity sets, a particular velocity set may be selected. This may include ranking the velocity sets based on their scores and selecting the velocity set with the best score. In some examples, more than one metric is evaluated, which may result in one or more scores. Each score may be weighted in order to produce a compound score. Selecting the velocity set may be based on the compound score. As illustrated in area 1113, for example, a velocity set ([3, 1.6, 3]) is shown as having been selected.

Figure 13:
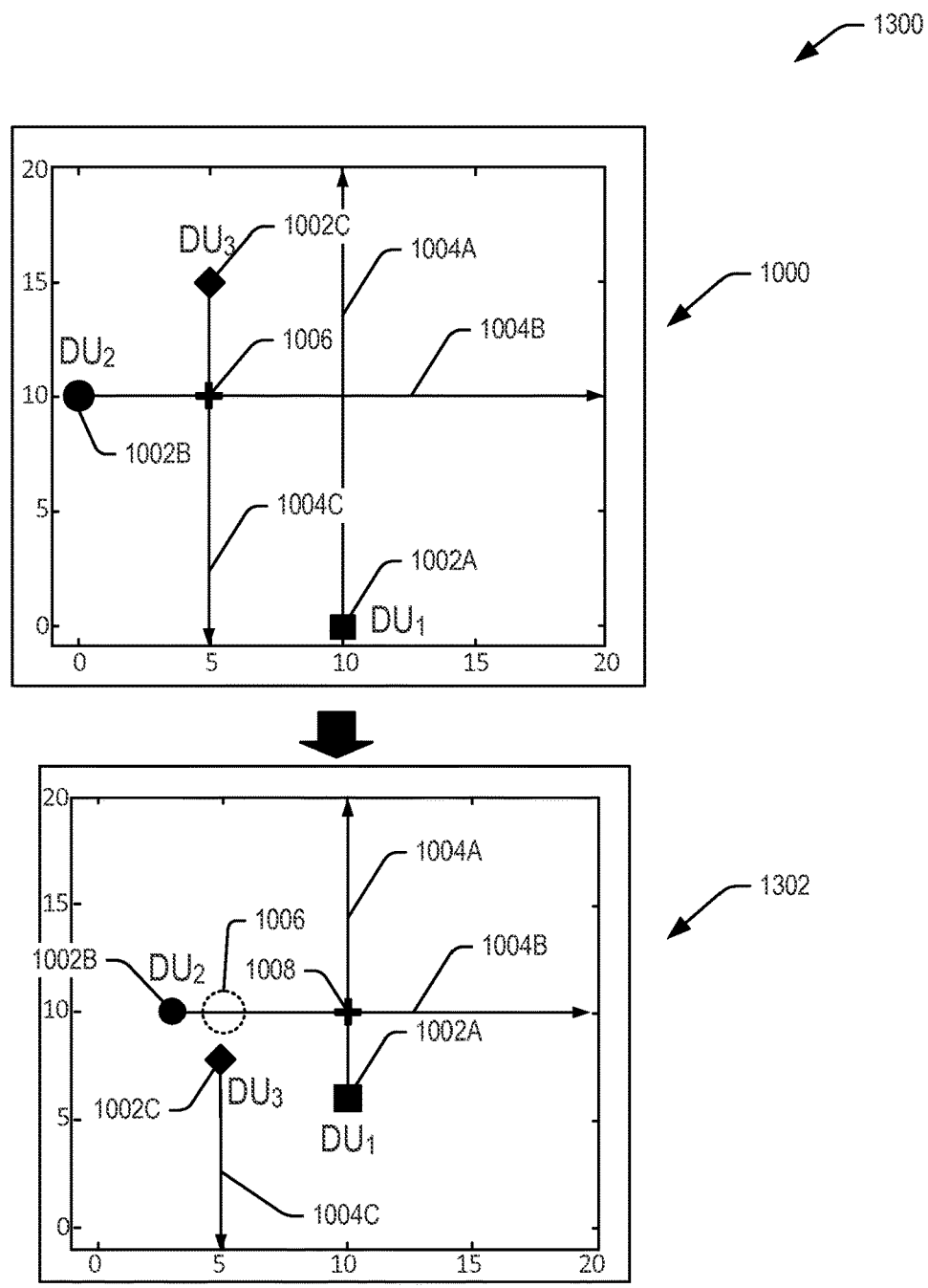
FIG. 13 illustrates a diagram depicting a transition from a first potential collision event state to a second potential collision event state in the context of techniques relating to discrete event-based coordination of mobile drive units as described herein, according to at least one embodiment.

At 1114, the process 1100 transitions to a new discrete event state based on the selected velocity set. In some examples, transitioning to the new discrete event state may be performed by the coordination module 99. Transitioning to the new discrete event state may include using the selected velocity set and location information for the mobile drive units in order to resolve a second potential collision event. FIG. 13 illustrates a discrete event state transition flow 1300, which is representative of the operation at 1114.

The event state transition flow 1300 may include the first graphical representation 1000 and a second graphical representation 1302. The second graphical representation 1302 represents states of the mobile drive units 1002A, 1002B, and 1002C after they have transitioned. In this example, the second graphical representation 1302 represents a later time after a potential collision event has been avoided at the first intersection 1006 (illustrated by a dashed circle in the second graphical representation 1302). Like the first graphical representation 1000, in some examples, the second graphical representation 1302 may represent intermediate states of the mobile drive units 1002A, 1002B, and 1002C' prior to the drive paths 1004A and 1004B intersecting at a second intersection 1008. In some examples, the second intersection 1008 may also be considered a location of a second potential collision event if the states of the mobile drive units 1002A and 1002B indicate such. In other words, a second potential collision may take place between the second mobile drive unit 1002B and the first mobile drive unit 1002A at the second intersection 1008 when, based on the intermediate velocities and intermediate locations of the mobile drive units 1002A and 1002B, it is determined that the mobile drive units 1002A and 1002B are planned to arrive at the second intersection 1008 at about the same time (e.g., within a range of 0.1 second to 1.5 seconds) or within some threshold distance of each other (e.g., 0.1 meter). In order to avoid the second potential collision event at the second intersection, the process 1100 may be repeated using the data from the second graphical representation 1302. In this manner, the discrete event-based coordination techniques may iterate through state after state until all potential collision events are resolved. In some examples, a second iteration may consider a second potential collision between the first mobile drive unit 1004A and the second mobile drive unit 1004B at the second intersection 1008. The transitioning between discrete event states may be driven by a specific discrete event state space search strategy. For example, different search strategies may be used to find an optimal sequence of discrete event states and corresponding velocity profiles for the drives depending on the selected scoring metric. The search strategies may include, for example, a greedy search, Dijkstra's search, or a general heuristic search such as variants of A* search which are well known to those of ordinary skill in the art.

The greedy search may seek to select the most promising velocities for the drives at each discrete event state to make the fastest progress towards a given objective being optimized as dictated by the selected scoring metric. Although suboptimal, this search strategy may possibly be the most computationally efficient among the others.

The Dijkstra's search may seek to find sequences of velocity profiles between a given initial discrete event state and every other. This type of search is guaranteed to find optimal solutions in contrast to the greedy search. For example, it may find a sequence of velocity profiles that minimizes the maximum time of arrival across the drives in a given group.

The heuristic search may seek to find a sequence of velocity profiles between given initial and final discrete event states while optimizing a given objective. In contrast to the Dijkstra's search, this type of search is computationally efficient mostly because of its ability to minimize the number of intermediate discrete event states being explored while still guaranteeing optimality.

Figure 14:
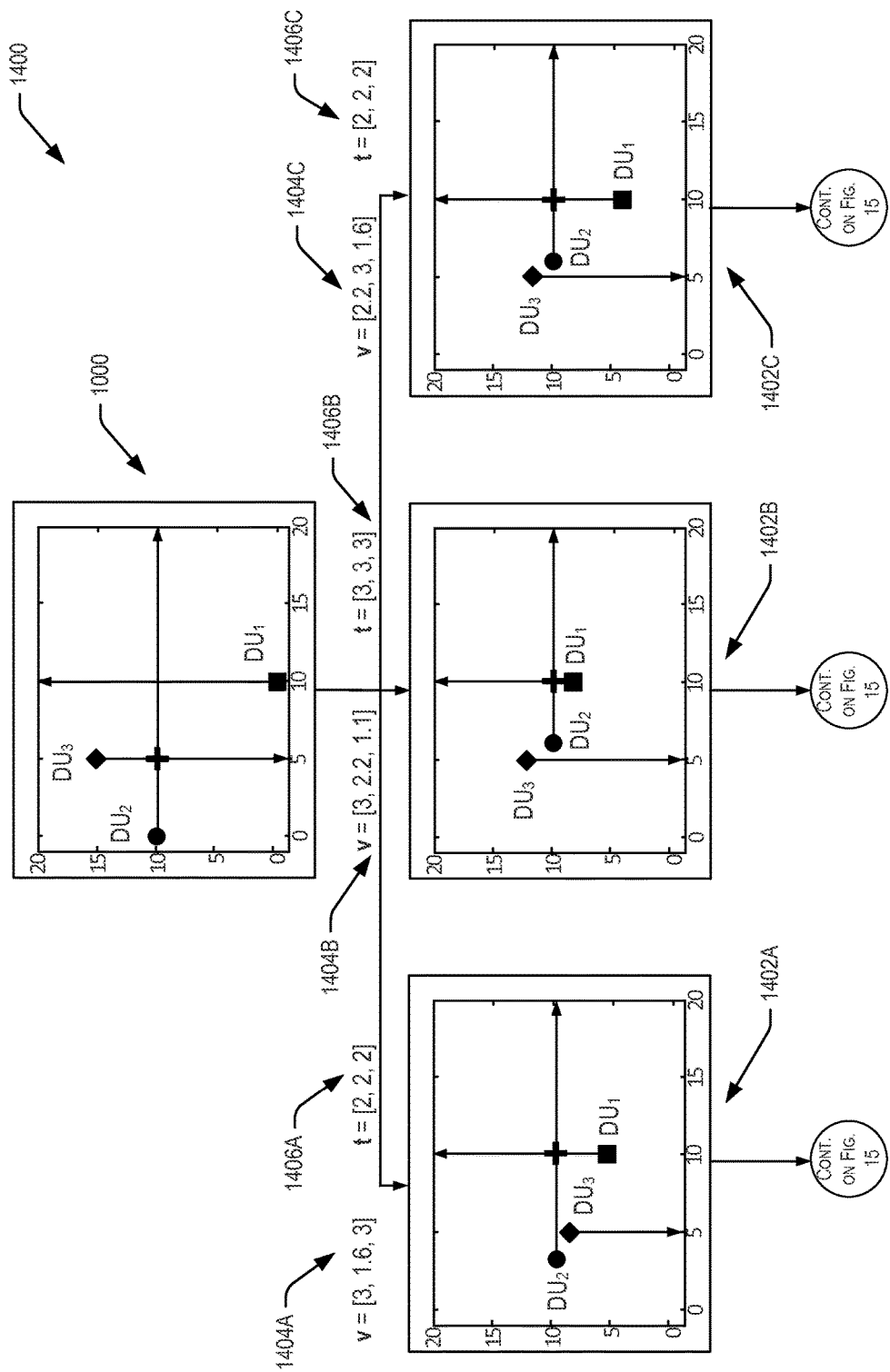
FIG. 14 illustrates a diagram depicting an initial state and a plurality of options for resolving a first potential collision event in the context of techniques relating to discrete event-based coordination of mobile drive units as described herein, according to at least one embodiment.
Figure 15:
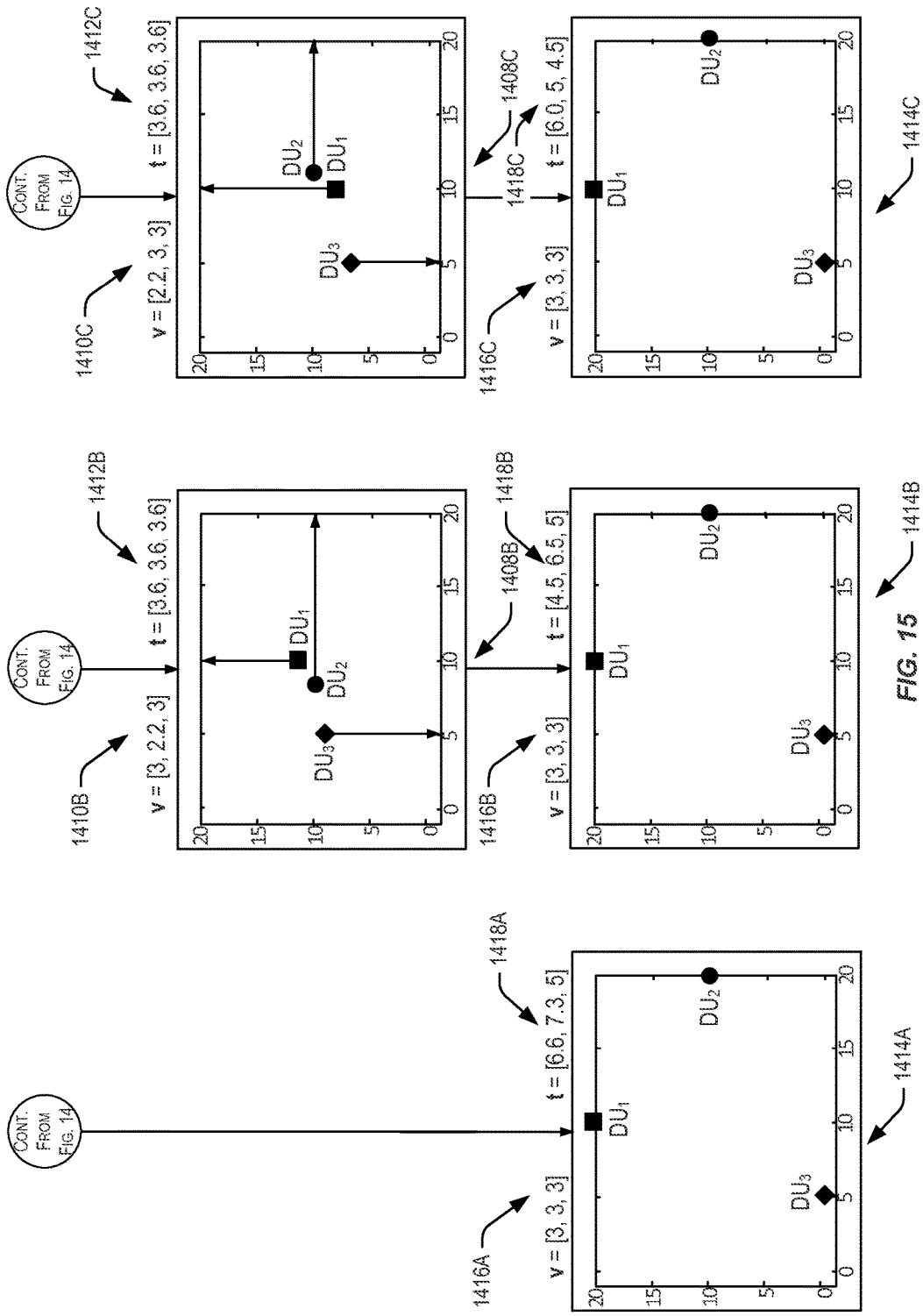
FIG. 15 illustrates a diagram depicting a plurality of options for resolving a second potential collision event and final states in the context of techniques relating to discrete event-based coordination of mobile drive units as described herein, according to at least one embodiment.

FIGS. 14 and 15 illustrate, in greater detail, a discrete state event transition flow 1400 that may correspond to the first graphical representation 1000, a portion of the process 1100, and other graphical representations which may represent velocity sets at various states that were determined at 1110 and assigned scores at 1112. In some examples, the state event transition flow 1400 may also represent a search tree including possible alternatives for resolving potential collision events. Generally, the system described herein may search using the search tree represented by state event transition flow 1400 for a sequence of velocity profiles (corresponding to a sequence of intermediate discrete event states) between two given discrete event states to find the sequence that optimizes a given objective such as time of arrival, stability, etc. As the mobile drive units move in the space, the system may be configured to continue to evaluate the velocity profiles (including recomputing) to handle unexpected events on the floor such as previously undetected obstacles and possible deviations in the motion of the mobile drive units. In some examples, branches of the search tree may include one or more nodes representing different discrete event states, which may represent related alternatives, which, in some cases, may depend on earlier alternatives. In some examples, each node may be evaluated using a scoring metric in order to determine whether to select the node and continue down the branch.

The first graphical representation 1000 may represent an initial discrete event state in which initial states (e.g., location and direction) for the mobile drive units are represented. A second state may be represented by second graphical representations 1402A, 1402B, and 1402C. In some examples, the second graphical representation 1402A is an example of the second graphical representation 1302. In any event, the second graphical representations 1402A, 1402B, and 1402C may represent three distinct options for avoiding a potential collision event using three different second velocity sets (1404A, 1404B, and 1404C). In this example, the three second velocity sets 1404A, 1404B, and 1404C may correspond to the three remaining velocity sets determined at 1110 and illustrated in area 1111 and 1113. In addition to the three second velocity sets 1404A, 1404B, and 1404C, three corresponding second time sets 1406A, 1406B, and 1406C may be determined. In some examples, each time value in each of the second time sets 1406A, 1406B, and 1406C may correspond to each velocity value in each of the second velocity sets 1404A, 1404B, and 1404C. For example, with reference to the second velocity set 1404A, the velocity values for the mobile drive units are 3, 1.6, and 3. The corresponding time values for the mobile drive units to reach the second locations illustrated in the second graphical representation 1402A are 2, 2, and 2 (i.e., the second time sets 1406A). The second velocity sets 1404B and 1404C may have similar relationships with their respective second time sets 1406B and 1406C, respectively.

In some examples, one of the second velocity sets 1404A, 1404B, or 1404C may be selected in accordance with a scoring metric. FIG. 15 illustrates, however, other graphical representations, other velocity sets, and other time sets that may depend, at least in part, on the second velocity sets 1404A, 1404B, and 1404C. A final graphical representation 1414A may depend from the second graphical representation 1402A and the second velocity set 1404A. In this example, after computing the second velocity set 1404A, the system selected the second velocity set 1404A and then selected final velocity set 1416A that directed all three mobile drive units to full speed (e.g., 3 m/s). Based on the three velocity values of 3, 3, and 3 of the final velocity set 1416A, three time values (e.g., 6.6, 7.3, and 5) in a final time set 1418A may be computed. These time values in the final time set 1418A may represent the total time from the initial locations to the final destinations for each drive unit, illustrated in the final graphical representation 1414A. In this example, the "final destinations" may refer to destinations that are final with respect to the potential collision events and/or the window in which the potential collision events are evaluated. In other words, the "final destinations" may not necessarily correspond to the final destinations associated with one or more tasks.

A third graphical representation 1408B may depend from the second graphical representation 1402B and the second velocity set 1404B. Likewise, a third graphical representation 1408C may depend from the second graphical representation 1402C and the second velocity set 1404C'. In this example, after computing the second velocity sets 1404B and 1404C, the system may then resolve a second potential collision event. The third graphical representations 1408B and 1408C may illustrate discrete event states after the second potential collision event has been avoided. To this end, the third graphical representation 1408B may include a third velocity set 1410B and a third time set 1412B. The third graphical representation 1408C may include a third velocity set 1410C and a third time set 1412C.

A final graphical representation 1414B may depend from the third graphical representation 1408B and the third velocity set 1410B. Likewise, a final graphical representation 1414C may depend from the third graphical representation 1408C and the third velocity set 1410C. In this example, after computing the third velocity sets 1410B and 1410C, the system may then compute final velocity sets 1416B and 1416C with corresponding final time sets 1418B and 1418C. The final graphical representations 1414B and 1414C may represent final states of the mobile drive units.

In some examples, selection of a sequence of velocity profiles may be performed by evaluating the data represented by the graphical representations depicted in FIGS. 14 and 15 in order to select a sequence of velocity profiles based on a time of arrival metric. The time of arrival metric may, in some examples, select the minimum time of a set of maximum times for any particular mobile drive unit to travel from the initial state (represented in the first graphical representation 1000) to the final state (represented in one of the final graphical representations 1414A-1414C). For example, for the sequence from 1000 to 1414A, the total time for $DU_2$ may be a maximum time for any particular mobile drive unit according to this sequence, and the total time for $DU_2$ to reach the final state in 1414A is 9.3 seconds (2 seconds from the second time set 1406A plus 7.3 seconds from the final time set 1418A). For the sequence from 1000 to 1414B, the total time for $DU_2$ may be a maximum time for any particular mobile drive unit according to this sequence, and the total time for $DU_2$ to reach the final state in 1414B is 13.1 seconds (3 seconds from the second time set 1406B plus 3.6 seconds from the third time set 1412B plus 6.5 from the final time set 1418B). For the sequence from 1000 to 1414C, the total time for $DU_1$ may be a maximum time for any particular mobile drive unit according to this sequence, and the total time for $DU_1$ to reach the final state in 1414C is 11.6 seconds (2 seconds from the second time set 1406C plus 3.6 seconds from the third time set 1412C plus 6 seconds from the final time set 1418C). In this example, the set of maximum times for any particular mobile drive unit in each sequence is 9.3 seconds, 13.1 seconds, and 11.6 seconds. If the time of arrival metric were used as the scoring metric, the minimum time of 9.3 seconds will be selected and the velocity sets that correspond to the minimum time will be provided to the mobile drive units. It is understood that while FIGS. 14 and 15 are illustrative of selecting velocity sets based on a time of arrival metric, the use of other scoring metrics may result in the selection of different velocity sets.

Figure 16:
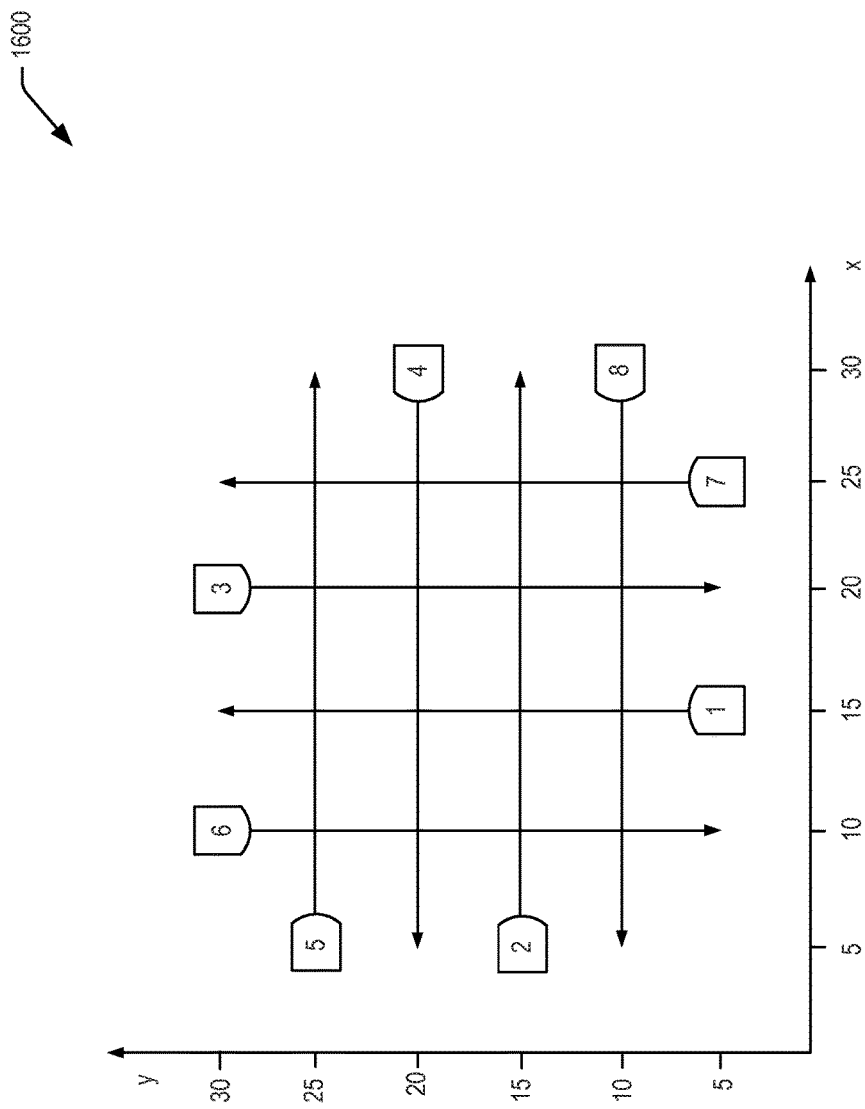
FIG. 16 illustrates a diagram depicting a plurality of mobile drive units and a plurality of potential collision events in the context of techniques relating to discrete event-based coordination of mobile drive units as described herein, according to at least one embodiment.
Figure 17:
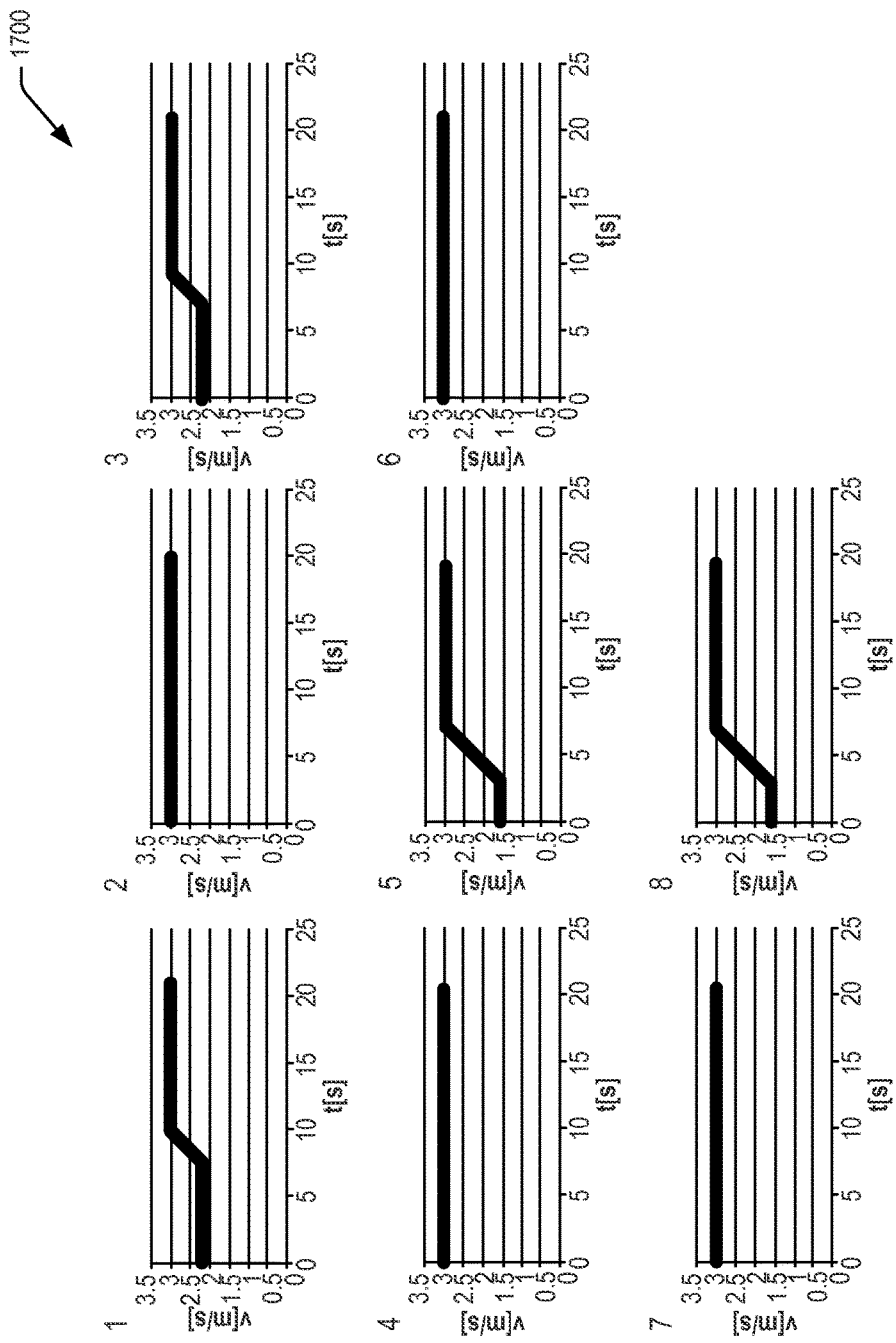
FIG. 17 illustrates a diagram depicting a plurality of velocity profiles selected in accordance with techniques relating to discrete event-based coordination of mobile drive units as described herein, according to at least one embodiment.

FIG. 16 illustrates a graphical representation 1600 which includes eight mobile drive units. In the graphical representation 1600, sixteen potential collision events are illustrated as sixteen intersections of eight drive paths of the eight mobile drive units. In some examples, each potential collision event may be resolved using the event-based coordination techniques described herein. In some examples, one or more of the potential collision events may be resolved in parallel. Because certain potential collision events may depend on other potential collision events, some potential collision events may be resolved sequentially. By utilizing the discrete event-based coordination techniques, a velocity set may be output for each mobile drive unit. In some examples, each velocity set and time set may be represented as a velocity profile for each mobile drive unit. FIG. 17 illustrates diagram 1700 that includes eight velocity profiles corresponding to each of the eight mobile drive units in FIG. 16. The diagram 1700 illustrates example velocity profiles with example acceleration ramps. It is understood that different velocity profiles with steeper or more gradual acceleration ramps are also within the scope of this specification. If the mobile drive units operate in accordance with the velocity profiles in diagram 1700, all sixteen potential collision events will be avoided. In some examples, event-based coordination techniques may be applied to inventory systems that include many mobile drive units (e.g., hundreds or thousands) by segmenting groups of mobile drive units. In this manner, the operation of the inventory system may be improved as the mobile drive units operate in more efficient manners in accordance with the selected scoring metric.

Figure 18:
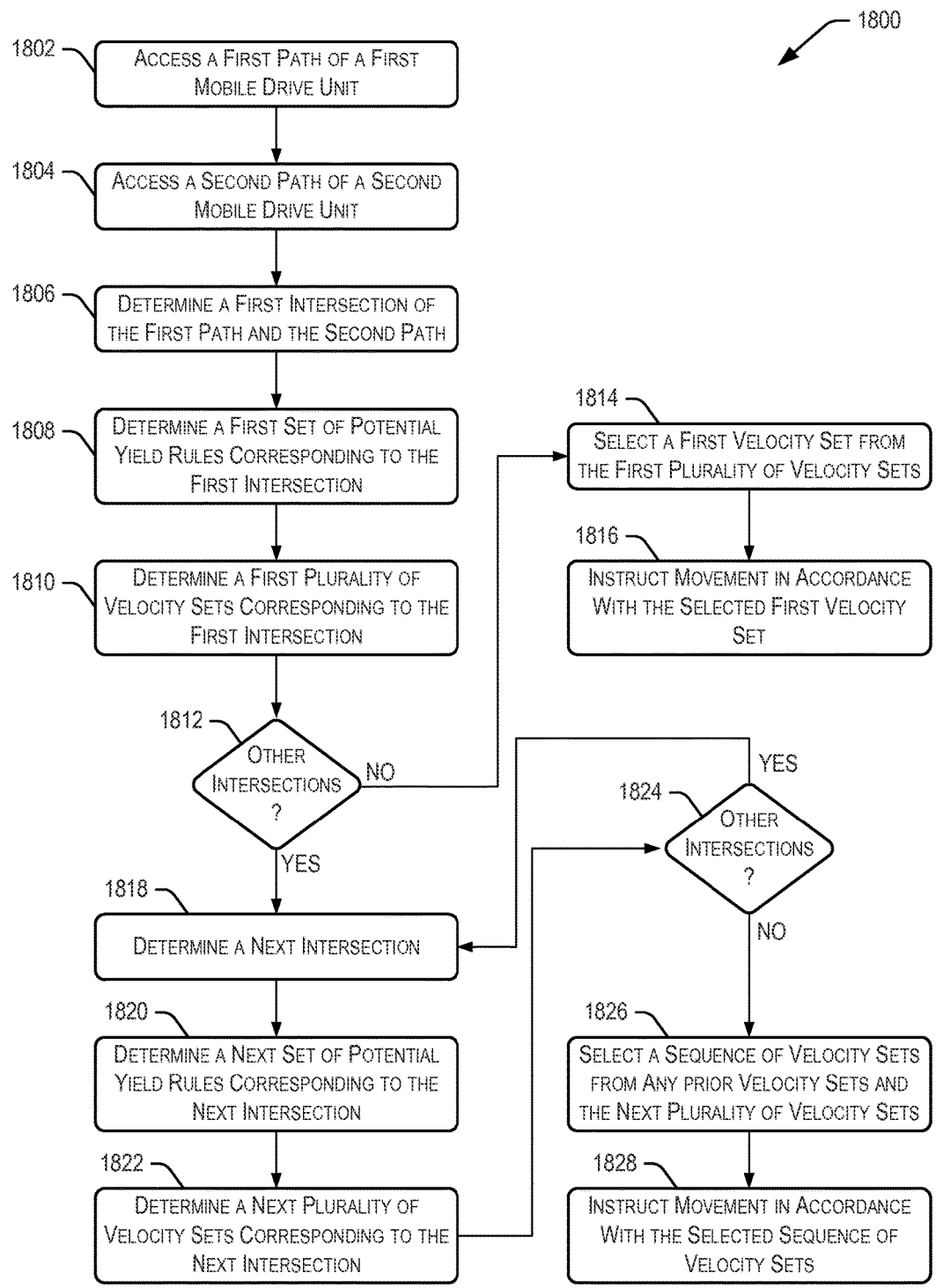
FIG. 18 illustrates a flow diagram depicting example acts for implementing techniques relating to discrete event-based coordination of mobile drive units as described herein, according to at least one embodiment.

FIG. 18 depicts the process 1800 including example acts and/or procedures relating event-based coordination of mobile drive units in accordance with at least one example. The management module 15 (FIG. 3) may perform the process 1800 of FIG. 18. The process 1800 begins at 1802 by accessing a first path of a first mobile drive unit. In some examples, accessing the first path may be performed by the coordination module 99 (FIG. 2) or the route planning module 94 (FIG. 2). The first path may be located within a workspace associated with an inventory system. In some examples, the first mobile drive unit may have a first initial location along the first path. The first initial location may be represented as a geometric location within the workspace. The first path may be a one-dimensional segment of a first task path of the first mobile drive unit. In some examples, the one-dimensional segment includes a straight section of the first path or a curved section of the first path.

At 1804, the process 1800 accesses a second path of a second mobile drive unit. In some examples, accessing the second path may be performed by the coordination module 99 or the route planning module 94. The second path may be located within the workspace. In some examples, the second mobile drive unit may have a second initial location along the second path. The second initial location may be represented as a geometric location with the workspace. The second path may be a one-dimensional segment of a second task path of the second mobile drive unit. In some examples, the one-dimensional segment includes a straight section of the second path. In some examples, the first mobile drive unit and the second mobile drive unit belong to a set of mobile drive units, including other mobile drive units. In some examples, large groups of mobile drive units may be broken down into sets and evaluated using the process 1800.

At 1806, the process 1800 determines a first intersection of the first path and the second path. In some examples, determining the first intersection may be performed by the coordination module 99. Determining the first intersection may be based at least in part on the first initial location and the second initial location. In some examples, determining the first intersection may further be based at least in part on a first orientation for the first mobile drive unit and a first maximum velocity for the first mobile drive unit and a second orientation for the second mobile drive unit and a second maximum velocity for the second mobile drive unit. In some examples, the first intersection may include a location within the workspace where the first mobile drive unit and the second mobile drive unit may collide unless the first mobile drive unit or the second mobile drive unit (or both) are instructed to vary their velocities (e.g., yield to each other). Thus, the first intersection may include a location of a first potential collision event. In some examples, the first path may be orthogonal with respect to the second path. In some examples, the first intersection may include a location of a potential collision event between a leading portion of the second mobile drive unit and a side portion of the first mobile drive unit, or between a leading portion of the first mobile drive unit and a side portion of the second mobile drive unit. In some examples, the first path may be parallel with respect to the second path (e.g., in head-on or follow situations). In some examples, the first intersection may include a location of a potential collision event between a leading portion of the second mobile drive unit and a trailing portion of the first mobile drive unit, or between the leading portion of the second mobile drive unit and a leading portion of the first mobile drive unit. The techniques described herein may be applicable to any potential collision event arising from any suitable intersection of two or more drive paths. For example, this may include intersections along curved portions of drive paths (e.g., parametric curves).

At 1808, the process 1800 determines a first set of potential yield rules corresponding to the first intersection. In some examples, determining the first set of potential yield rules may be performed by the coordination module 99. The first set of potential yield rules may be applicable to the first mobile drive unit and/or the second mobile drive unit. For example, each potential yield rule may indicate that, prior to arriving at the intersection, the first mobile drive unit yields, the second mobile drive unit yields, the first mobile drive unit and the second mobile drive unit yield, or neither the first mobile drive unit nor the second mobile drive unit yields. In some examples, determining the first set of potential yield rules may include eliminating one or more potential yield rules that would require both the first mobile drive unit and the second mobile drive unit to yield to each other.

At 1810, the process 1800 determines a first plurality of velocity sets corresponding to the first intersection. In some examples, determining the first plurality of velocity sets may be performed by the coordination module 99. Determining the first plurality of velocity sets may be based at least in part on the first set of potential yield rules. In some examples, each velocity set may include at least one velocity value corresponding to the first mobile drive unit or the second mobile drive unit. In some examples, the first plurality of velocity sets may also include at least one unknown velocity value corresponding to the first mobile drive unit or the second mobile drive unit. In some examples, determining the first plurality of velocity sets may also include eliminating, from the first plurality of velocity sets, one or more velocity sets that, if selected, would lead to a potential collision event between the first mobile drive unit and the second mobile drive unit. In some examples, certain other velocity sets that are duplicates may be removed. In some examples, the velocity sets may correspond to different alternatives for resolving the potential collision event.

At 1812, the process 1800 determines whether other intersections exist between the first mobile drive unit, the second mobile drive unit, and/or other mobile drive units. In some examples, determining whether other intersections exist may be performed by the coordination module 99. Determining whether other intersections exist may be based at least in part on characteristics of the first intersection (e.g., location), characteristics of the mobile drive units at the first intersection (e.g., velocities for the mobile drive units, orientation of the mobile drive units, and locations for the mobile drive units), and characteristics of other mobile drive units and their paths. For example, as described herein, the first intersection can be treated as an intermediate state, and state information can be used to determine whether there will be other intersections between the first and second mobile drive unit or between others and the first and/or second mobile drive unit. For example, the first potential collision event at the first intersection may be between the first mobile drive unit and the second mobile drive unit, while a later potential collision at a later intersection may be between a third mobile drive unit and one of the first or second mobile drive units.

If the determination at 1812 is NO, the process 1800 proceeds to 1814 where the process 1800 selects a first velocity set from the first plurality of velocity sets. In some examples, selecting the first velocity set may be performed by the coordination module 99. Selecting the first velocity set may include selecting the velocity set from among the first plurality of velocity sets based at least in part on a scoring metric. In some examples, the scoring metric may be one or more of the scoring metrics described herein. In some examples, selecting the first velocity set may include generating, based at least in part on the scoring metric, one or more scores corresponding to each velocity set and selecting, based at least in part on the one or more scores, the first velocity set. In some examples, the first plurality of velocity sets may be ranked with respect to the one or more scores in order to generate a ranked set of velocity sets. In some examples, selecting the first velocity set may include selecting based on the ranked set and/or ranked scores. In some examples, each velocity set of the first plurality of velocity sets is scored prior to the first velocity set being selected. In some examples, the selected first velocity set corresponds to a first velocity profile for the first mobile drive unit and a second velocity profile for the second mobile drive unit.

At 1816, the process 1800 instructs movement in accordance with the selected first velocity set. In some examples, instructing movement in accordance with the selected first velocity set may be performed by coordination module 99 or the route planning module 94. Instructing movement may include providing instructions to the one or more mobile drive units that include the respective velocity values from the selected first velocity set. In some examples, instructing movement may include instructing the first mobile drive unit and the second mobile drive unit to move in accordance with the selected first velocity set. In some examples, when the management module is local with respect to the mobile drive units, instructing movement may include instructing components of the mobile drive units to move. Instructing movement in accordance with the selected first velocity set may enable the first mobile drive unit and the second mobile drive unit to avoid a collision at the first intersection.

If the determination at 1812 is YES, the process 1800 proceeds to 1818 where the process 1800 determines a next intersection of the first path, the second path, and/or other paths. In some examples, determining the next intersection may be performed by the coordination module 99. Determining the next intersection may be based at least in part on intermediate locations (e.g., at the first intersection) of the first and second mobile drive units. In some examples, determining the next intersection may further be based at least in part on a first intermediate orientation for the first mobile drive unit and a first maximum velocity for the first mobile drive unit and a second intermediate orientation for the second mobile drive unit and a second maximum velocity for the second mobile drive unit. In some examples, the next intersection may include a location within the workspace where the first mobile drive unit and the second mobile drive unit may collide unless the first mobile drive unit or the second mobile drive unit (or both) are instructed to vary their velocities (e.g., yield to each other). In some examples, the next intersection may include a location within the workspace where other mobile drive units may possibly collide, and may therefore depend on information describing other paths, other velocities, other locations, and other orientations.

At 1820, the process 1800 determines a next set of potential yield rules corresponding to the next intersection. In some examples, determining the next set of potential yield rules may be performed by the coordination module 99. The next set of potential yield rules may be applicable to the first mobile drive unit, the second mobile drive unit, and/or other mobile drive units. For example, each potential yield rule may indicate, prior to arriving at the next intersection, different combinations of yielding between the first mobile drive unit, the second mobile drive unit, and/or other mobile drive units. In some examples, determining the next set of potential yield rules may include eliminating one or more potential yield rules that present cycles.

At 1822, the process 1800 determines a next plurality of velocity sets corresponding to the next intersection. In some examples, determining the next plurality of velocity sets may be performed by the coordination module 99. Determining the next plurality of velocity sets may be based at least in part on the next set of potential yield rules. In some examples, each velocity set may include at least one velocity value corresponding to the first mobile drive unit, the second mobile drive unit, and/or another mobile drive unit. In some examples, the next plurality of velocity sets may also include at least one unknown velocity value corresponding to the first mobile drive unit or the second mobile drive unit. In some examples, determining the next plurality of velocity sets may also include eliminating, from the next plurality of velocity sets, one or more velocity sets that, if selected, would lead to a potential collision event at the next intersection. In some examples, certain other velocity sets that are duplicates may be removed. In some examples, the velocity sets may correspond to different alternatives for resolving the potential collision event at the next intersection.

At 1824, the process 1800 determines whether other intersections exist between the first mobile drive unit, the second mobile drive unit, and/or other mobile drive units. In some examples, determining whether other intersections exist may be performed by the coordination module 99 and in a manner similar to 1812. If the answer at 1824 is YES, the process 1800 returns to 1818, where a next intersection is determined. If the answer at 1824 is NO, the process 1800 proceeds to 1826.

At 1826, the process 1800 selects a sequence of velocity sets from any prior velocity sets and the next plurality of velocity sets. In some examples, selecting the sequence of velocity sets may be performed by the coordination module 99. Selecting the sequence of velocity sets may include selecting a sequence of velocity values that can be included in velocity profiles for the mobile drive units. In some examples, selecting the sequence of velocity sets from among the prior velocity sets and the next plurality of velocity sets may be based at least in part on a scoring metric. In some examples, the scoring metric may be one or more of the scoring metrics described herein. In some examples, selecting the sequence of velocity sets may include generating, based at least in part on the scoring metric, one or more scores corresponding to each velocity set and selecting, based at least in part on the one or more scores, the sequence of velocity sets. In some examples, the prior velocity sets and the next plurality of velocity sets may be ranked with respect to the one or more scores in order to generate a ranked set of velocity sets. In some examples, selecting the sequence of velocity sets may include selecting based on the ranked set and/or ranked scores. In some examples, each velocity set of the prior velocity sets and the next plurality of velocity sets is scored prior to the next velocity set being selected. In some examples, selecting the sequence of velocity sets may include searching through a space of discrete event states as determined to find a sequence of velocity values applied at corresponding discrete event states for the mobile drive units to reach their goal states. During the search for a sequence of velocity sets, each discrete event state in this sequence may be evaluated using a scoring metric as described herein.

At 1828, the process 1800 instructs movement in accordance with the selected sequence of velocity sets. In some examples, instructing movement in accordance with the selected sequence of velocity sets may be performed by coordination module 99 or the route planning module 94. Instructing movement may include providing instructions to the one or more mobile drive units that include the respective velocity values from the selected sequence of velocity sets. These velocity values may represent a sequence of velocity values evaluated at the different states. In some examples, instructing movement may include instructing the first mobile drive unit, the second mobile drive unit, and/or other mobile drive units to move in accordance with the selected sequence of velocity sets. Instructing movement in accordance with the selected sequence of velocity sets may enable the first mobile drive unit, the second mobile drive unit, and/or other mobile drive units to avoid a collision at the next intersection. In some examples, implementing techniques relating to discrete event-based coordination of mobile drive units may increase efficiency of the motion of the mobile drive units resulting in increased efficiency of the inventory system, decrease wear and tear on physical components of the mobile drive units because of a decrease in aggressive starts and stops, decrease lost inventory as a result of the mobile drive units operating more smoothly and stably, and increase traffic predictability of the mobile drive units within the inventory system.

Figure 19:
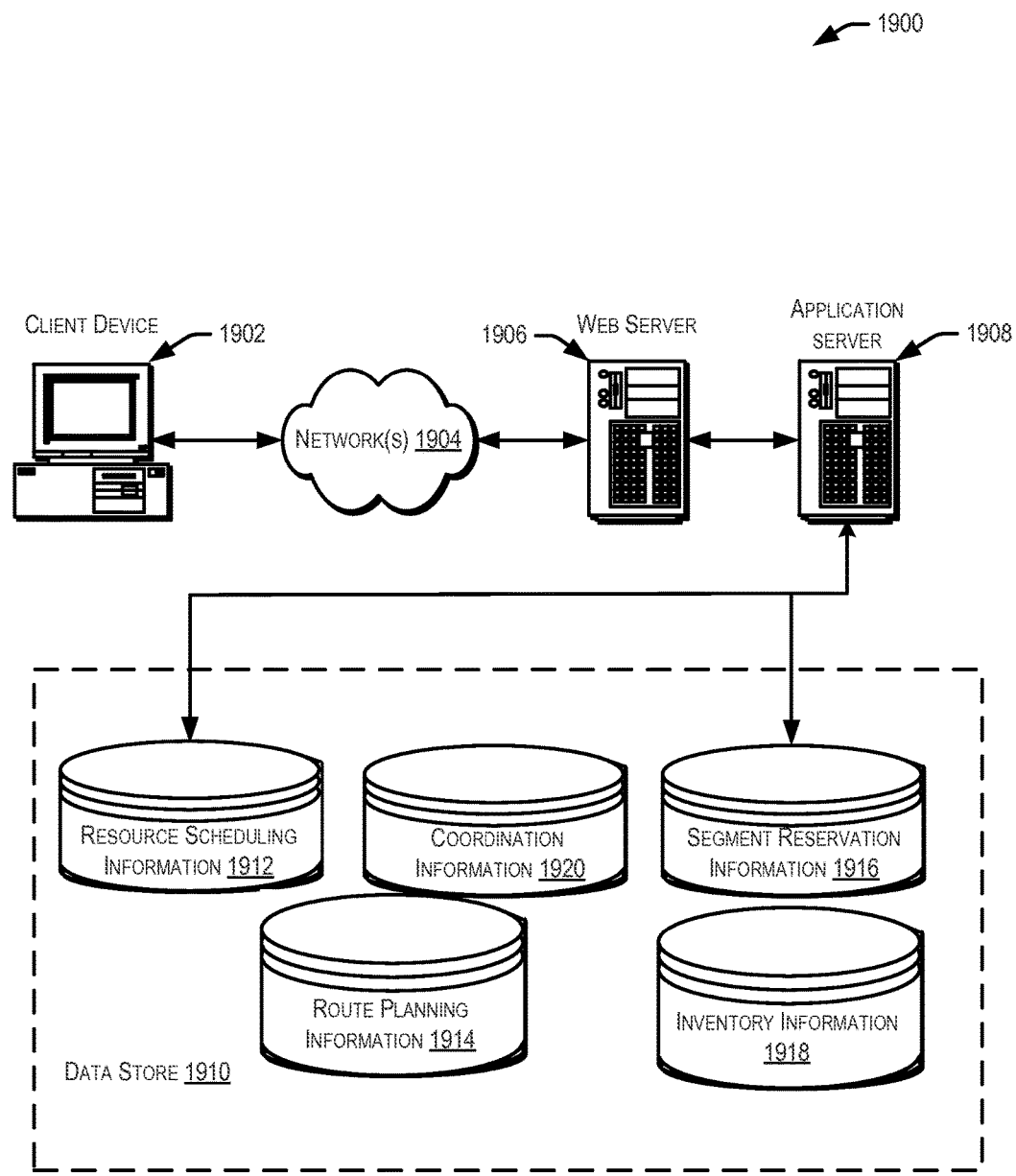
FIG. 19 illustrates an environment in which various features of the inventory system can be implemented, according to at least one embodiment.

FIG. 19 illustrates aspects of an example environment 1900 for implementing aspects in accordance with various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages, or information over an appropriate network 1904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used, as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1902 and the application server 1908, can be handled by the Web server. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing information which can be used by modules described herein, such as resource scheduling information 1912, route planning information 1914, segment reservation information 1916, inventory information 1918, and/or coordination information 1920. It should be understood that there can be many other aspects that may need to be stored in the data store, such as for page image information and to access right information, which can be stored in any of the above-listed mechanisms as appropriate or in additional mechanisms in the data store 1910. The data store 1910 is operable, through logic associated therewith, to receive instructions from the application server 1908 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the environment 1900 in FIG. 19 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybasex, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   accessing a first path of a first mobile drive unit within a workspace, the first mobile drive unit having a first initial location along the first path;
   accessing a second path of a second mobile drive unit within the workspace, the second mobile drive unit having a second initial location along the second path;
   determining an intersection point of the first path and the second path within the workspace;
   determining a set of potential yield rules applicable to the first mobile drive unit and the second mobile drive unit, each potential yield rule indicating that, prior to arriving at the intersection point, (a) the first mobile drive unit yield, (b) the second mobile drive unit yield, (c) the first mobile drive unit and the second mobile drive unit yield, or (d) neither the first mobile drive unit nor the second mobile drive unit yield;
   determining, based at least in part on the set of potential yield rules, a first plurality of velocity sets, each velocity set comprising at least a first velocity value corresponding to the first mobile drive unit and a second velocity value corresponding to the second mobile drive unit, wherein movement in accordance with any velocity set from the first plurality of velocity sets causes the first mobile drive unit and the second mobile drive unit to avoid a potential collision event at the intersection point;
   determining, based at least in part on a second intersection, a second plurality of velocity sets corresponding to the first mobile drive unit and the second mobile drive unit;
   searching a space of discrete event states at which velocities are applied at discrete event states to find sequences of discrete event states, with each sequence of discrete event states forming a corresponding sequence of velocity sets, each sequence of velocity sets comprising at least one velocity set from the first plurality of velocity sets and at least one velocity set from the second plurality of velocity sets;
   evaluating each sequence of velocity sets at corresponding sequences of discrete event states using a scoring metric;
   selecting, based at least in part on evaluating each sequence, a particular sequence of velocity sets; and
   controlling the first mobile drive unit and the second mobile drive unit by instructing the first mobile drive unit and the second mobile drive unit to move in accordance with the particular sequence of velocity sets.

2. The computer-implemented method of claim 1, further comprising:
   after determining the set of potential yield rules, eliminating one or more potential yield rules from the set of potential yield rules that would require both the first mobile drive unit and the second mobile drive unit to yield to each other;
   determining, based on the set of potential yield rules, a plurality of candidate velocity sets, each candidate set of the plurality of candidate velocity sets including at least one velocity value corresponding to the first mobile drive unit or the second mobile drive unit; and
   eliminating, from the plurality of candidate velocity sets, one or more candidate velocity sets that, if selected, would lead to the potential collision event at the intersection point between the first mobile drive unit and the second mobile drive unit.

3. The computer-implemented method of claim 1, wherein determining the intersection point of the first path and the second path is further based at least in part on the first initial location, a first initial orientation of the first mobile drive unit, a maximum speed for the first mobile drive unit, the second initial location, a second initial orientation of the second mobile drive unit, and a maximum speed for the second mobile drive unit.

4. The computer-implemented method of claim 1, wherein the scoring metric comprises one or more of a time of arrival metric, an energy expenditure metric, a component wear metric, a stability metric, a jerk metric, or an acceleration metric.

5. The computer-implemented method of claim 4, wherein evaluating each sequence of velocity sets includes generating, based at least in part on the scoring metric, one or more scores corresponding to each sequence of velocity sets.

6. A computer-implemented method, comprising:
    determining a first intersection of a first path and a second path, the first path being associated with a first mobile drive unit, and the second path being associated with a second mobile drive unit;
    determining, based at least in part on the first intersection, a first plurality of velocity sets corresponding to the first mobile drive unit and the second mobile drive unit, each velocity set of the first plurality of velocity sets comprising at least a first velocity value corresponding to the first mobile drive unit and a second velocity value corresponding to the second mobile drive unit, wherein movement in accordance with any velocity set from the first plurality of velocity sets causes the first mobile drive unit and the second mobile drive unit to avoid a potential collision event at the first intersection;
    determining, based at least in part on a second intersection, a second plurality of velocity sets corresponding to the first mobile drive unit and the second mobile drive unit;
    searching a space of discrete event states at which velocities are applied at discrete event states to find sequences of discrete event states, with each sequence of discrete event states forming a corresponding sequence of velocity sets, each sequence of velocity sets comprising at least one velocity set from the first plurality of velocity sets and at least one velocity set from the second plurality of velocity sets;
    evaluating each sequence of velocity sets at corresponding sequences of discrete event states using a scoring metric;
    selecting, based at least in part on evaluating each sequence, a particular sequence of velocity sets, the particular sequence of velocity sets comprising first particular velocity values corresponding to the first mobile drive unit and second particular velocity values corresponding to the second mobile drive unit; and
    controlling at least one of the first mobile drive unit or the second mobile drive unit by instructing at least one of the first mobile drive unit or the second mobile drive unit to move in accordance with the particular sequence of velocity sets.

7. The computer-implemented method of claim 6, wherein the first intersection comprises a location within a workspace where the first mobile drive unit and the second mobile drive unit may collide unless at least one of the first mobile drive unit or the second mobile drive unit is instructed to move in accordance with the selected velocity set.

8. The computer-implemented method of claim 6, further comprising, prior to determining the first plurality of velocity sets, determining a set of potential yield rules applicable to the first mobile drive unit and the second mobile drive unit, at least one potential yield rule of the set of potential yield rules indicating that at least one of the first mobile drive unit or the second mobile drive unit adjusts its velocity prior to arriving at the intersection.

9. The computer-implemented method of claim 8, wherein determining the first plurality of velocity sets is further based at least in part on the set of potential yield rules.

10. The computer-implemented method of claim 6, wherein:
    evaluating each the sequence of velocity sets includes:
        generating, based at least in part on the scoring metric, one or more scores corresponding to each sequence of velocity sets; and
        ranking the one or more scores relative to each other to create a ranked set of scores; and
    selecting the particular sequence of velocity sets is based at least in part on the ranked set of scores, the velocity set.

11. The computer-implemented method of claim 6, wherein the first path is orthogonal with respect to the second path at the intersection, and wherein the intersection comprises a location of the potential collision event between a leading portion of the second mobile drive unit and a side portion of the first mobile drive unit, or between a leading portion of the first mobile drive unit and a side portion of the second mobile drive unit.

12. The computer-implemented method of claim 6, further comprising:
    prior to determining the first plurality of velocity sets, determining, based at least in part on a set of potential yield rules, a plurality of candidate velocity sets, each set of the plurality of candidate velocity sets comprising at least one known velocity value corresponding to the first mobile drive unit or the second mobile drive unit; and
    eliminating, from the plurality of candidate velocity sets, one or more candidate velocity sets that, if selected, would lead to the potential collision event at the intersection between the first mobile drive unit and the second mobile drive unit.

13. A system, comprising:
    a plurality of mobile drive units disposed within a workspace and in communication with a management module; and
    the management module comprising a memory and a processor configured to:
        access a plurality of drive paths corresponding to a set of the plurality of mobile drive units, the plurality of drive paths located within the workspace;
        determine a plurality of initial positions corresponding to the set of the plurality of mobile drive units;
        determine a first intersection of at least two of the plurality of drive paths;
        determine, based at least in part on the first intersection, a first plurality of velocity sets, wherein each velocity set of the first plurality of velocity sets includes at least two velocity values with a first velocity value applicable to a first mobile drive unit of the set of the plurality of mobile drive units and a second velocity value applicable to a second mobile drive unit of the set of the plurality of mobile drive units, wherein moving in accordance with any velocity set of the first plurality of velocity sets causes the first mobile drive unit and the second mobile drive unit to avoid a first potential collision at the first intersection;

determine, based at least in part on a second intersection, a second plurality of velocity sets corresponding to the first mobile drive unit and the second mobile drive unit;

search a space of discrete event states at which velocities are applied at discrete event states to find sequences of discrete event states, with each sequence of discrete event states forming a corresponding sequence of velocity sets, each sequence of velocity sets comprising at least one velocity set from the first plurality of velocity sets and at least one velocity set from the second plurality of velocity sets;

evaluate each sequence of velocity sets at corresponding sequences of discrete event states using a scoring metric;

select based at least in part on evaluating each sequence, a particular sequence of velocity sets, the particular sequence of velocity sets comprising two or more velocity profiles corresponding to the first and second mobile drive units; and control the first and second mobile drive units by providing the particular sequence of velocity sets to the first and second mobile drive units to move in accordance with the particular sequence of velocity sets.

14. The system of claim 13, wherein the management module is further configured to determine the second intersection by at least:

accessing the plurality of drive paths corresponding to the set of the plurality of mobile drive units; and determining, based at least in part on the first plurality of velocity sets, a plurality of updated positions corresponding to the set of the plurality of mobile drive units, wherein moving in accordance with the particular sequence of velocity sets avoids a second potential collision of the first mobile drive unit or the second mobile drive unit with a different mobile drive unit at the second intersection.

15. The system of claim 13, wherein the scoring metric comprises one or more of a time of arrival metric, an energy expenditure metric, a component wear metric, a stability metric, a jerk metric, or an acceleration metric.

16. The system of claim 13, wherein the plurality of drive paths is represented by a plurality of geometric paths within the workspace and the plurality of initial positions is represented by a plurality of sets of geometric coordinates within the workspace, and wherein determining the first intersection of the plurality of drive paths comprises:

accessing maximum velocities corresponding to the set of the plurality of mobile drive units;

determining, based at least in part on the maximum velocities and the initial positions, projected positions represented by one or more other sets of geometric coordinates within the workspace, the projected positions corresponding to the set of the plurality of mobile drive units; and identifying the first intersection as a location within the workspace where two or more of the projected positions at least partially overlap.

17. The system of claim 13, wherein determining the first plurality of velocity sets is further based at least in part on a safety measure, the safety measure providing for individual safety zones that surround individual mobile drive units of the set of the plurality of mobile drive units.

18. The system of claim 13, wherein the management module is further configured to:

after determining the first intersection, determine a set of potential yield rules indicating that at least one mobile drive unit of the set of the plurality of mobile drive units yields prior to the first intersection;

exclude, from the set of potential yield rules, one or more potential yield rules that would prevent two or more mobile drive units from progressing by yielding to each other prior to the intersection; and exclude, from the one or more velocity sets, other velocity sets that, if selected, would lead to the first potential collision of the two or more mobile drive units at the first intersection.

19. The system of claim 13, wherein:

the plurality of mobile drive units is configured to detachably couple to and transport a plurality of inventory holders; and the plurality of inventory holders is configured to receive inventory items.

20. The computer-implemented method of claim 6, further comprising determining the second intersection comprises determining an intersection of the first path and the second path or an intersection of at least one of the first path or the second path and a different path.

* * * * *

UNITED STATES PATENT AND TRADEMARK OFFICE
CERTIFICATE OF CORRECTION

PATENT NO. : 10,126,747 B1
APPLICATION NO. : 14/869265
DATED : November 13, 2018
INVENTOR(S) : Petr Svec, Matthew Paul Bell and Michael T. Barbehenn Page 1 of 1

It is certified that error appears in the above-identified patent and that said Letters Patent is hereby corrected as shown below:

In the Claims

Column 42, Line 15, Claim 10:
Delete: "evaluating each the sequence of velocity sets includes:"
Insert: --evaluating each sequence of velocity sets includes:--

Column 42, Lines 22-23, Claim 10:
Delete: "at least in part on the ranked set of scores, the velocity set."
Insert: --at least in part on the ranked set of scores.--

Signed and Sealed this
Fourteenth Day of May, 2019

Andrei Iancu
*Director of the United States Patent and Trademark Office*